(12) United States Patent
Teng et al.

(10) Patent No.: US 12,411,979 B1
(45) Date of Patent: Sep. 9, 2025

(54) SYSTEMS AND METHODS FOR DETECTING PERSONAL INFORMATION

(71) Applicant: Amazon Technologies, Inc., Seattle, WA (US)

(72) Inventors: Ganyu Teng, Bellevue, WA (US); Chia Hsuan Wu, Vancouver (CA); Wei Ding, Vancouver (CA); Gjorgji Krsteski, Coquitlam (CA); Mikhail Kuznetsov, Jersey City, NJ (US); Uday Chandrasen, Burnaby (CA)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 17/949,720

(22) Filed: Sep. 21, 2022

(51) Int. Cl.
  *G06F 21/62* (2013.01)
(52) U.S. Cl.
  CPC .............................. *G06F 21/6245* (2013.01)
(58) Field of Classification Search
  CPC ............... G06F 16/137; G06F 16/2379; G06F 16/2445; G06F 21/602; G06F 21/6245; G06F 21/6254; G06F 40/279; G06F 40/295; H04L 63/00; H04L 69/329
  See application file for complete search history.

(56) References Cited

U.S. PATENT DOCUMENTS

| | | | |
|---|---|---|---|
| 12,008,045 B2 * | 6/2024 | Ojha | G06F 40/295 |
| 2004/0193915 A1 * | 9/2004 | Smith | H04L 69/329 |
| | | | 726/1 |
| 2021/0224415 A1 * | 7/2021 | Qi | G06F 40/279 |
| 2022/0198055 A1 * | 6/2022 | Deshmukh | G06F 16/137 |
| 2022/0284119 A1 * | 9/2022 | Chacko | G06F 21/6254 |
| 2023/0064482 A1 * | 3/2023 | Vikramaratne | G06F 21/6245 |
| 2023/0129763 A1 * | 4/2023 | Kovachev | G06F 16/2445 |
| | | | 707/722 |
| 2023/0153427 A1 * | 5/2023 | Croteau | H04L 63/00 |
| | | | 726/22 |
| 2023/0195928 A1 * | 6/2023 | Sridhar | G06F 21/602 |
| | | | 726/27 |
| 2023/0409558 A1 * | 12/2023 | Wysocki | G06F 16/2379 |
| 2023/0418970 A1 * | 12/2023 | Dobrin | G06F 21/6245 |

* cited by examiner

*Primary Examiner* — Dustin Nguyen
(74) *Attorney, Agent, or Firm* — Eversheds Sutherland (US) LLP

(57) ABSTRACT

Systems and techniques are disclosed for determining personally identifiable information in one or data file. An input data file is analyzed to determine whether it includes structured data based on an explicit indicator and/or header content. If it includes structured data, the data in the file is sampled and standardized for input to a machine-learned personally identifiable information that provide personally identifiable information detection results indicating quantities and types of personally identifiable information detected. The results are used with the input file to determine aggregated personally identifiable information results that may be presented to a user without exposing any personally identifiable information.

20 Claims, 10 Drawing Sheets

|   | FIRST NAME | LAST NAME | PHONE NUMBER | EMAIL |
|---|---|---|---|---|
| 1 | JANE | SMITH | 404-555-2216 | JANES@NOMAIL.COM |
| 2 | PAUL | BROWN | 232 ELM ST. | PB123@EMAIL.ORG |
| 3 | SUZY | DOE | 525-555-8564 | SUZE34@UNMAIL.GOV |
| 4 | LARRY | WILLIAMS | 742 GREEN ST. | WILLIAMSL@NONMAIL.COM |
| ⋮ | ⋮ | ⋮ | ⋮ | ⋮ |

INPUT FILE 700
710, 712, 714, 716, 718
720, 722

FIG. 7

PII DETECTION RESULTS 800

PII DETECTED 810

INPUT FILE ID: INPUT FILE 700
FIRST NAMES (FIRST COLUMN): 1542
LAST NAMES (SECOND COLUMN): 1545
EMAIL ADDRESSES (FOURTH COLUMN): 1544

PROCESSING DETAILS 820

PREPROCESSING VERSION: 2.34
SMART SCANNER VERSION: 1.2
PII DETECTION MODEL VERSION: 2.5
PROCESSING TIME: 1.654s
INPUT FILE SIZE: 8.2MB
START TIME: 08/25/2022 - 20:35:26 UTC

FIG. 8

SYSTEMS AND METHODS FOR DETECTING PERSONAL INFORMATION

BACKGROUND

The use of cloud information storage systems has grown exponentially in recent years. Many types of organizations and users use cloud information storage systems to store data, including business and other organizations that may handle personally identifiable information (PII). PII may include any data that can potentially be used to identify a particular person or otherwise distinguish one person from another. Examples of PII include names, addresses, telephone number, email addresses, social security numbers, driver's license numbers, account numbers, etc. PII may be contained in various types of files that may be stored in a cloud information storage system. Files that store PII may be structured data files that are formatted and/or organized in a particular manner and/or include data organization information, such as headers, column identifiers, row identifiers, etc. Unstructured data files may also be used to store PII, such as plain text files.

An operator of a cloud information storage system may desire or may be required (e.g., by legal regulations, standards body requirements, employer requirements, etc.) to detect or otherwise determine PII that may be stored in the cloud information storage system. For example, the operator may need to determine a quantity of PII stored in its system (e.g., as a whole and/or for a particular user or organization) and/or the types of PII stored in its system. In some cases, the operator may wish to determine this information without exposing or otherwise viewing the actual PII stored in the system. Because PII may be stored in a large number of files of a wide variety of file types, it can be challenging to determine the quantity and types of PII stored in a cloud information storage system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a representation of an example structured data file that may be processed by a PII detection system as disclosed herein.

FIG. 8 illustrates a representation of an example user interface that may present PII detection results data determined by processing an input file using a PII detection system as disclosed herein.

DETAILED DESCRIPTION

Figure 1:
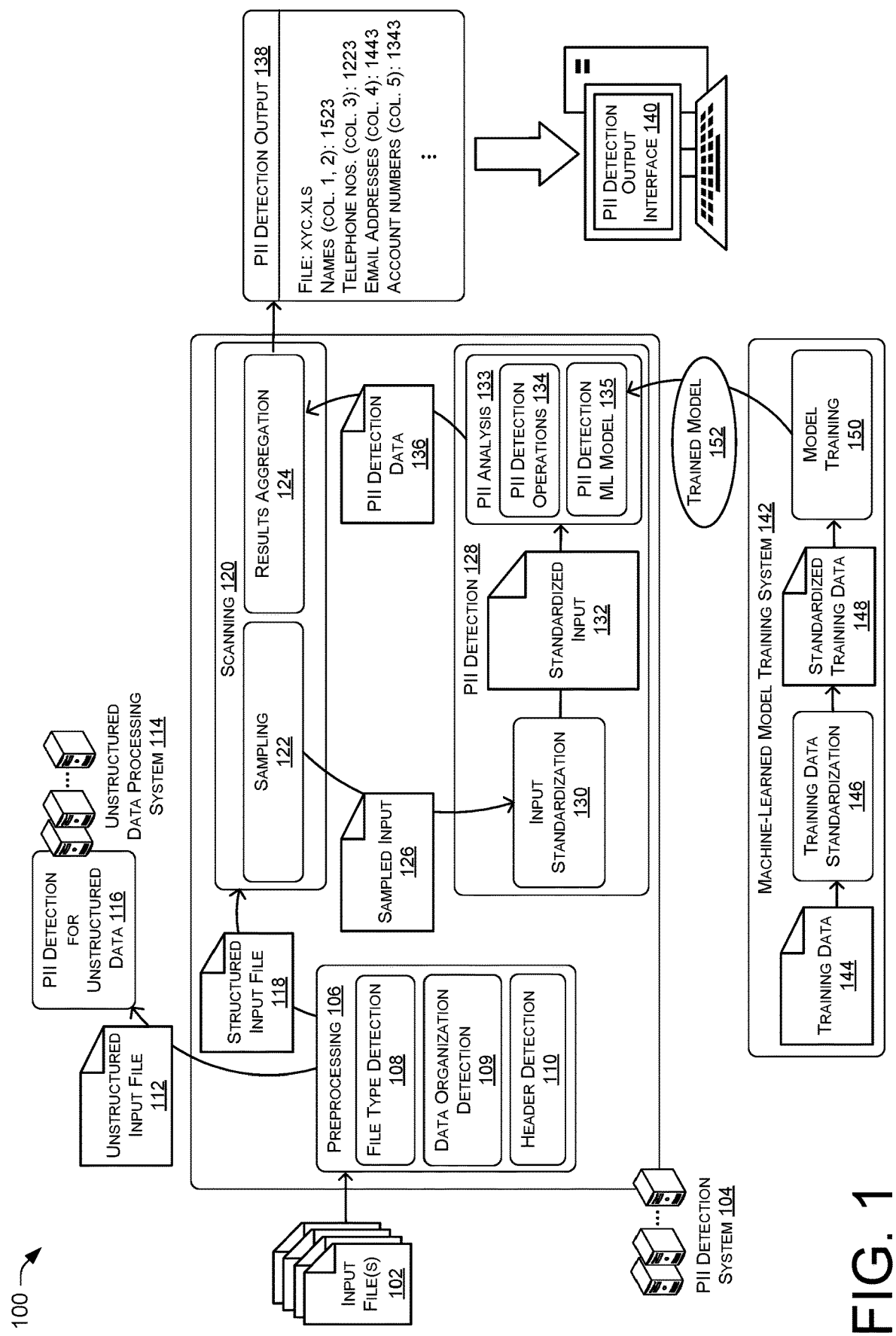
FIG. 1 illustrates a system-architecture diagram of an example environment in which a PII detection system may be implemented.

A cloud information storage system may be used to store data for customers of various types. For example, customers of such a storage system may be individual users that may use the cloud information storage system to store personal information. Customers of such a storage system may also, or instead, be businesses and/or other types of organizations that may store and process data associated with their users. This user data may include personal information. Such personal information may be any data that may potentially identify a particular human user or otherwise distinguish one user from another. Such information may be referred to as personally identifiable information or "PII." Examples of PII include names, addresses, telephone number, email addresses, social security numbers, driver's license numbers, account numbers, etc.

Cloud information storage system customers may store their data in a variety of file types that may include structured data files and/or unstructured data files. Structured data files may be files that are associated with a particular format and/or arrangement of data and may include data organization information, such as headers, column identifiers, row identifiers, cell identifiers, etc. The particular format or file type of a structured data file may be associated with a particular multipurpose internet mail extension (MIME) type that indicates the type of content and/or format of the file. In various examples, the MIME type of a file may be explicitly indicated by a (e.g., HTML) type attribute and/or in file metadata. In some examples, a file type and/or MIME type may be indicated in the file name, for example, by a file name extension (e.g., ".csv," ".xls," ".xlsx," "json," etc.). Unstructured data files may not be associated with any particular format and/or arrangement of data, such as plain text files. Unstructured data files may also be indicated by their files names using a file name extension (e.g., ".txt") and/or other data (e.g., metadata) associated with the file. Unstructured data files may or may not include data organization information (e.g., headers, identifiers, etc.). PII may be contained in structured and/or unstructured data files that may be stored in a cloud information storage system.

A cloud information storage system operator (or any other entity that may have access to PII) may use a PII detection system to determine PII that may be included in one or more data files. In various examples, the PII detection system may determine a quantity and/or type of PII in one or more data files, in some examples without exposing the PII in the file to an operator of the PII detection system.

A PII detection system may be configured to perform PII detection processing on one or more input files. A PII detection system may use various components to perform this processing. These components may include a preprocessing component that may be configured to determine whether an input file is a structured data or unstructured data. The preprocessing component may provide unstructured data files to an unstructured data processing system (e.g., implemented as a separate system) for PII detection, while providing structured data files as input files to a scanning and PII detection components. A scanning component may be configured to determine and provide sampled data and associated information from the structured input file to a PII detection component and receive PII detection results from the PII detection component. The scanning component may further use the PII detection results to determine aggregated results data for the input file that may be provided to a user or operator, for example, in a user interface on a computing device or resource.

The PII detection component may perform processing and PII detection operations on an input file (e.g., a sampled input file received from a scanning component). For example, the PII detection component may standardize the data represented by the received input file and provide the standardized data to a machine-learned model trained to perform PII detection. The PII detection components may provide the output generated by this model to another component, such as the scanning component, for further processing and/or presentation (e.g., on a user interface). The machine-learned PII detection model may be trained using similarly standardized training data as described in more detail herein.

More specifically, in various examples, a preprocessing component of a PII detection system may perform preprocessing on an input file to determine whether the file is a structured data file. The preprocessing component may initially determine whether the input file is associated with a label, name, and/or other clear designation of a structured file type. For example, the preprocessing component may determine if there is a MIME type associated with the input file and/or if the file name of the input file has a structured file extension (e.g., ".csv," ".xls," ".xlsx," "json," etc.). If the input file is associated with a structured data file name or other structured data file indicator, the preprocessing component may provide the input file to a scanning component for further processing.

If the preprocessing component does not determine that the input file is associated with a structured data file name or other structured data file indicator, the preprocessing component may analyze the contents of the file to determine whether the data within the input file indicates that the input file is a structured data file or otherwise contains structured data. To make this determination, the preprocessing component may determine whether the data in the input file appears to be organized as structured data. For example, the preprocessing component may determine whether the data represented in the input file is organized in a table or other form of data structure and/or includes headers and/or other data organization indicators or is instead organized in an unstructured manner (e.g., entirely or primary string(s) of texts, lacking data organization indicators, etc.). If the preprocessing component determines that the data may be organized, it may evaluate potential headers in the file to further determine whether the input file represents structured data. If the input file does not appear to contain organized data, the preprocessing component may provide the input file to an (e.g., external and/or separate) unstructured data processing system for PII detection.

In evaluating headers in an input file that may contain organized data, the preprocessing component may evaluate a first "row" or set of data represented in the file from among one or more rows or sets of data contained in the file to determine whether that row is a "header" that may contain file organizational data that may be used to determine a structure for the input file. As described in more detail herein, the preprocessing component may use various criteria to determine whether a first row (or any other row(s)) of an input file is a header. This criteria may include whether the first row contains substantive data (e.g., primarily non-null data), whether the types of data represented in the first row differ from the types of data represented in a second or subsequent row, whether any of the values in the first row are the same or substantially similar to values in a second or subsequent row, and/or whether a threshold number of the data storage units (e.g., cells) of the first row have a size that is the same or substantially similar to data storages units in a second or subsequent row. If the first row of the input file meets the header criteria, the preprocessing component may provide the input file to a scanning component for further processing, in some examples along with structured data file information that the preprocessing component may determine based on one or more header determination operations. If the first row of the input file does not meet the header criteria, the preprocessing component may provide the input file to an (e.g., external and/or separate) unstructured data processing system for PII detection.

The scanning component may perform one or more operations using a received structured input file to determine PII detection data based on interaction with a PII detection component. In various examples, the scanning component may sample the input file to determine a subset of the data represented in the file (e.g., a subset of the rows of data). The scanning component may also determine header information for the file. The scanning component may use the sampled data and header to data to determine sampled input data that the scanning component may provide to a PII detection component for PII detection.

The scanning component may receive PII detection results from the PII detection component that the PII detection component may have determined based on the sampled input data. Using these PII detection results and the received structured input file, the scanning component may determine aggregated PII detection results data. Such aggregated results data may include quantities of particular types of PII, but may not, in some examples, include actual PII. In this way, the amount and type of PII in a particular file may be provided to a PII detection system operator without exposing the actual PII. The scanning component may provide the aggregated results data to a PII detection output interface that may be executed on, for example, a computing resource or computing device, and that may present the aggregated PII detection results data for the input file to a user.

The PII detection component may receive a sampled input data from a scanning component. The PII detection component may perform one or more standardization operations on the sampled input data to determine standardized input data. The PII detection component may provide this standardized input data to a machine-learned model executed by the PII detection component to determine PII in the standardized input data. The PII detection component may also, or instead, provide this standardized data to one or more components that may perform one or more other PII detection operations (e.g., using pattern matching, keyword matching, etc.). The PII detection results determined as output from this machine-learned PII detection model and/or other PII detection operations may then be provided back to the scanning component for further processing and/or presentation on a user interface as described herein. By using one or more standardization operations to provide standardized input to the machine-learned PII detection model, the training and execution of such a model may be performed more efficiently because the data processed by the model may be in a same or substantially similar format and structure regardless of the input file or training data source of such data. Similarly, by using one or more standardization operations to provide standardized input to one or more other PII detection operations, the design and execution of such operations may be performed more efficiently because the data processed by these operations may be in a same or substantially similar format and structure regardless of the input file or other source of such data.

A machine-learned PII detection model may be trained using similarly standardized training data. In various examples, training data that, in some cases, may resemble real-world or actual structured input file data, may be standardized as described in more detail herein. This standardized training data may be used as input by a model training system for training the model to detect PII. The trained model may then be executed to determine PII in input files in a production environment by, for example, a PII detection component of a PII detection system as described herein.

The disclosed systems and techniques provide a more efficient means of determining PII in one or more files (e.g., stored in a cloud information storage system). By facilitating a more efficient formatting and standardization of data for processing by a machine-learned model trained to detect PII in such standardized data, the examples described herein may provide faster and more efficient means of determining PII information for an operator while ensuring that PII is not unnecessarily exposed. For example, in the disclosed system, representative samples of data in a structured data file may be standardized and processed by a model to estimate the PII content in the structured data file. By processing a sampled subset of an input file, there may be less data to process, thereby reducing the number of processor cycles needed to process the file, memory resources to store the sampled data, and network resources required to transmit the sampled data. Furthermore, by using standardized model input data, the model may be more efficiently executed and trained by reducing the performance of inefficient operations for determining a type of PII and other data that may be more efficiently determined from the standardized input data, thereby further reducing resource requirements associated with processing of a variety of file types and data structures is reduced. Thus, the disclosed systems and techniques help maintain PII security while minimizing inefficacies and improving system performance.

The techniques and systems described herein may be implemented in a number of ways. Example implementations and additional details are provided below with reference to the following figures.

FIG. 1 is a block diagram of an illustrative environment 100 that may be a portion of, or otherwise associated with, a cloud information storage system or any other type of data processing and/or storage system. The environment 100 may include a PII detection system 104, an unstructured data processing system 114, and a machine-learned model training system 142. The environment 100 may also include a PII detection output interface 140 that may facilitate user interaction with the PII detection system 104 and presentation of PII detection results data to a user. The systems 104, 112, and 142, as well as the interface 140, may each represent one or more physical and/or logical resources, such as one or more server computers, virtual machines, software resources, databases, notebooks clusters, datasets, etc., or any combination thereof.

The PII detection system 104 may be configured to receive and determine PII information for data contained within or otherwise associated with one or more input data files, such as input file(s) 102. The input file(s) 102 may include one or more files stored at a cloud information storage system associated with environment 100. For example, the input file(s) 102 may be files stored at a cloud information storage system associated with environment 100 by one or more customers of an operator of the cloud information storage system associated with environment 100. One or more of the input files 102 may include user data (e.g., associated with users associated with customers of the operator of the cloud information storage system). This user data may include PII. An operator of the cloud information storage system, the PII detection system 104, and/or a customer thereof, may request PII information for the input file(s) 102.

The PII detection system 104 may provide or otherwise receive an input file of the input file(s) 102 at a preprocessing component 106. The preprocessing component 106 may include a file type detection component 108 and a header detection component 110. The preprocessing component 106 may (e.g. first) perform one or more file detection operations on the input file at the file type detection component 108 to determine whether the file is explicitly indicated as a structured file. For example, the file type detection component 108 may determine whether the input file is associated with a label, name, and/or other explicit indication of a structured file type. For example, the file type detection component 108 may determine if there is a MIME type associated with the input file and/or if the file name of the input file has a structured file extension (e.g., ".csv," ".xls," ".xlsx," "json," etc.). Alternatively, or additionally, the file type detection component 108 may determine whether other data associated with the input file (e.g. input file metadata) indicates a particular type of structured data file that may be associated with the input file. If the input file is associated with an explicit indication of a structured data file type, the preprocessing component 106 may provide this file (e.g., structured input file 118) to a scanning component 120.

If the file type detection component 108 does not determine an explicitly indicated structured file type for the input file, the file type detection component 108 may provide the input file to a data organization detection component 109 for evaluation of the organization of the data within the input file. In various examples, the preprocessing system 106 (e.g., the data organization detection component 109) may determine whether the data within an input file that has not been explicitly indicated or otherwise determined to be a structured file type is organized in a manner that indicates that the file contains structured data. For example, the data organization detection component 109 may determine whether the data contained in the input file is organized as a table of data or uses another similar data structure for data organization. If so, the data organization detection component 109 may determine that the input file is likely to contain structured data and provide the input file to the header detection component 110 for header evaluation. If the data organization detection component 109 determines that the input file is unlikely to contain structured data (e.g., appears to be primarily (e.g., only) strings of characters, paragraphs of text, otherwise unorganized data, etc.), the data organization detection component 109 may provide the input file as unstructured input file 112 to the unstructured data processing system 114.

If the data organization detection component 109 determines that the data in the input file is organized in a structured data manner, the data organization detection component 109 may provide the input file to the header detection component 110. The header detection component may evaluate data within the input file to determine if there is header data associated with the input file that implies a structured file type. The header detection component 110 may use one or more criteria to determine whether the input file includes a header or header data. In various examples, all such criteria may be required to designate the input file as having a header, while in other examples, satisfying one or more such criteria may suffice to designate the input file as having a header.

In various examples, in order to determine whether the input file contains structured data and/or header data, the header detection component 110 may determine a first row (e.g., a first row of cells, a first row of data, a first set of data, etc.) in the input data file includes null data, a value of "none" (or similar value), or is empty. In some examples, the first cell or data storage element in such a row may be excluded from this determination because the first cell in a header row may be typically left empty or assigned a null value because the values in the column under that cell may be index values used to index the rows. Alternatively, this first cell may include a value indicating that it represents an index column. If there are empty or null cells in the first row (other than the first cell), the first row is likely not a header. In this case, the header detection component 110 determines that the input file does not contain a header and therefore is an unstructured data file. Alternatively, the header detection component 110 may evaluate one or more other (e.g. subsequent) rows to determine whether one or more of such rows may be a header. If no header is determined in the input file, the header detection component 110 and/or the preprocessing component 106 may determine that the input file is unstructured data and provide the input file as unstructured input file 112 to the unstructured data processing system 114. Alternatively, the header detection component 110 may perform one or more other operations to determine whether the input file is a structured or an unstructured data file.

For example, the header detection component 110 may determine whether the types of data included in the cells of a first row of data in the input data file are the same or different than the types of data in the corresponding cells in a second or one or more subsequent rows. In some examples, cells in a header may be of a type of data that allows a description of the data that is stored in the cells underneath such header cells (e.g., in the column associated with the header cell). For example, a header may include cells with text data types that have the descriptive values of "date," "time," and "total," while the cells underneath such header cells (e.g., in the associated columns) may be cells with the data types of date, time, and number, respectively. If the data type of a cell in the first row of the input file is the same data type as that of a corresponding cell (e.g., below in the same column) in a second or one or more subsequent rows, the first row is less likely to be a header.

In some examples, some header cells may be of a text or descriptive data type while the corresponding cells in the same column are also of a text or descriptive type. In such examples, the header detection component 110 may use a threshold quantity or percentage of same data type cells in determining whether a particular row in an input file is a header row. For example, the header detection component 110 may determine that a row is not a header row if more than a threshold percentage (e.g., 10%, 25%, 50%, etc.) of the cells in the first row have a same data type as corresponding cells in a second or one or more subsequent rows. Alternatively or additionally, the header detection component 110 may determine that a row is not a header row if more than a threshold number (e.g., 1, 2, 3, 4, etc.) of the cells in the first row have a same data type as corresponding cells in a second or one or more subsequent rows.

If the header detection component 110 determines that cells in the first row of an input file have the same data type as cells in a second or one or more subsequent rows, or if a threshold number or percentage of cells in a first row of the input file are the same data type as corresponding cells in a second or one or more subsequent rows, the header detection component 110 may determine that the first row is not a header row. The header detection component 110 may determine that no header is determined in the input file based on this evaluation of the first row. Alternatively or additionally, the header detection component 110 may evaluate one or more other rows of the input file to determine if any such rows are headers. If no header is determined in the input file, the header detection component 110 and/or the preprocessing component 106 may determine that the input file is unstructured data and provide the input file as unstructured input file 112 to the unstructured data processing system 114. Alternatively, the header detection component 110 may perform one or more other operations to determine whether the input file is a structured or an unstructured data file.

In various examples, the header detection component 110 may determine whether the values represented in the cells of a first row of data in the input data file are the same or different than the values represented in the corresponding cells in a second or one or more subsequent rows. As noted above, cells of a header row typically include descriptive data (e.g., string or text data) while cells underneath such header cells (e.g., in the column associated with the header cell) may include substantive (e.g. user) data. For example, a header may include cells with text descriptive values of "date," "time," and "total," while the cells underneath such header cells (e.g., in the associated columns) may be cells with the data values of "Aug. 25, 2022," "08:36:24," and "42," respectively. If the value of a cell in the first row of the input file is the same value as that of a corresponding cell (e.g., below in the same column) in a second or one or more subsequent rows, the first row is less likely to be a header.

In some examples, a header cell may have a same value as a corresponding cell in the same column. In such examples, the header detection component 110 may use a threshold quantity or percentage of same value cells in determining whether a particular row in an input file is a header row. For example, the header detection component 110 may determine that a row is not a header row if more than a threshold percentage (e.g., 10%, 25%, 50%, etc.) of the cells in a first row have a same value as corresponding cells in a second or one or more subsequent rows. Alternatively or additionally, the header detection component 110 may determine that a row is not a header row if more than a threshold number (e.g., 1, 2, 3, 4, etc.) of the cells in a first row have a same value as corresponding cells in a second or one or more subsequent rows.

If the header detection component 110 determines that one or more cells in the first row of an input file have the same values as cells in a second or one or more subsequent rows, or if a threshold number or percentage of cells in a first row of the input file have the same value as corresponding cells in a second or one or more subsequent rows, the header detection component 110 may determine that the first row is not a header row. Here again, the header detection component 110 may determine that no header is determined in the input file based on the evaluation of the first row or the header detection component 110 may evaluate one or more other rows of the input file to determine if any such rows are headers. If no header is determined in the input file, the header detection component 110 and/or the preprocessing component 106 may determine that the input file is unstructured data and provide the input file as unstructured input file 112 to the unstructured data processing system 114. Alternatively, the header detection component 110 may perform one or more other operations to determine whether the input file is a structured or an unstructured data file.

In various examples, the header detection component 110 may determine whether one or more dimensions, such as length or size, of the values stored in the cells of a first row of data in the input data file are the same or different than the corresponding dimensions of the values stored in corresponding cells in a second or one or more subsequent rows. Values stored in cells of a header row may typically be of a size and/or length of the descriptive data (e.g., string or text data) contained in those cells, while values stored in the cells underneath such header cells (e.g., in the column associated with the header cell) may be of a different size and/or length associated with those values. For example, a header may include cells with text descriptive values of "date" having a size of four characters or four bytes, "time" having a size of four characters or four bytes, and "total" having a size of five characters or five bytes, while the cells underneath such header cells (e.g., in the associated columns) may be cells with the data values of "Aug. 25, 2022" having a size of 10 characters or bytes (or a size of an alternative date representation), "08:36:24" having a size of eight characters or bytes (or a size of an alternative time representation), and "42" having a size of two characters or bytes (or a size of an alternative number representation), respectively. If the size or length of a cell in the first row of the input file is the same size or length as that of a corresponding cell (e.g., below in the same column) in a second or one or more subsequent rows, the first row is less likely to be a header.

In some examples, a value in a header cell may have a same size or length as a value in a corresponding cell in the same column. In such examples, the header detection component 110 may use a threshold quantity or percentage of same value cells in determining whether a particular row in an input file is a header row. For example, the header detection component 110 may determine that a row is not a header row if more than a threshold percentage (e.g., 10%, 25%, 50%, etc.) of the cells in a first row have values that have a same size or length as values in corresponding cells in a second or one or more subsequent rows. Alternatively or additionally, the header detection component 110 may determine that a row is not a header row if more than a threshold number (e.g., 1, 2, 3, 4, etc.) of the cells in a first row have a value of the same size or length as the values in corresponding cells in a second or one or more subsequent rows.

If the header detection component 110 determines that one or more cells in the first row of an input file have values of the same size or length as the values in cells in a second or one or more subsequent rows, or if a threshold number or percentage of cells in a first row of the input file have values of the same size or length as the values of corresponding cells in a second or one or more subsequent rows, the header detection component 110 may determine that the first row is not a header row. Here again, the header detection component 110 may determine that no header is determined in the input file based on the evaluation of the first row or the header detection component 110 may evaluate one or more other rows of the input file to determine if any such rows are headers. If no header is determined in the input file, the header detection component 110 and/or the preprocessing component 106 may determine that the input file is unstructured data and provide the input file as unstructured input file 112 to the unstructured data processing system 114. Alternatively, the header detection component 110 may perform one or more other operations to determine whether the input file is a structured or an unstructured data file.

Note that in some examples, the header detection component 110 may determine that a row in an input file is a header if all header criteria are satisfied. For example, the header detection component 110 may only designate a row as a header row if the row does not include null values, does not have at least a threshold number/percentage of same data types as one or more subsequent rows, does not have at least a threshold number/percentage of same values as one or more subsequent rows, and does not have at least a threshold number of same cell lengths as one or more subsequent rows. In such examples, any single failure to satisfy such criteria may be result in the header detection component 110 designating the input file as having no header and therefore as being unstructured data. Alternatively, the header detection component 110 may determine that a row in an input file is a header if any one or more, or a sufficient threshold number, of header criteria are satisfied. Note that in other examples, any one or more other criteria may be used in addition to, or instead of, the header criteria described herein.

If the first row, or any one or more other rows, of the input file meets the header criteria, the header detection component 110 and/or the preprocessing component 106 may determine that the input file contains structured data and may provide the input file to the scanning component 120 as structured input file 118. In examples, the header detection component and/or the preprocessing component 106 may also provide determined data, such as a determined structured file type with the structured input file 118. If no header row or header data is determined, the header detection component 110 and/or the preprocessing component 106 may determine that the input file contains unstructured data and may provide the input file to the unstructured data processing system 114 as unstructured input file 112.

The scanning component 120 may be configured with a sampling component 122 and a results aggregation component 124. The scanning component 120 may provide the structured input file 118 to the sampling component 122 for determining sampled input 126 that may be provided to the PII detection component 128 for PII detection processing. In various examples, the scanning component 120 may determine a subset of the rows of the structured input file 118 to include in the sampled input 126. The number of rows selected may be determined based on various criteria. For example, the number of rows selected as sampled data may be a percentage (e.g., 5%, 10%, 25%, etc.) of the total number of rows in the structured input file 118 or a particular number (e.g., 5, 20, 100, 250, etc.) of the total number of rows in the structured input file 118. The number or percentage of rows selected for sampled data may be fixed and manually configured or may be dynamically determined based on one or more criteria. The number or percentage of rows selected for sampled data may be periodically adjusted and/or adjusted based on one or more detected conditions and/or triggers. The number or percentage of rows selected for sampled data may also, or instead, be based on an accuracy of one or more PII detection models that may be implemented to determine PII in the sampled data (e.g., the PII detection machine-learned model 135 of the PII detection component 128). In some examples, as the accuracy of a model increases, the number of sampled rows needed to perform accurate PII detection may decrease, and vice versa (e.g., more accurate models require fewer rows than less accurate models). The scanning component 120 may also determine header information included in the structured input file 118 and include this information in the sampled input 126.

As described in more detail below, the PII detection component 128 may perform one or more PII detection operations on the sampled input 126 to generate or otherwise determine the PII detection data 136 that may be provided to the scanning component 120 and, in particular, to the results aggregation component 124. Based on the PII detection data 136, the results aggregation component 124 may perform one or more operations to determine aggregated results data for the structured input file 118.

In various examples, the results aggregation component 124 may determine whether a threshold number or percentage of values in a column of the sampled input 126 have been indicated as being a particular type of PII in the PII detection data 136. If so, the results aggregation component 124 may determine the number of values in the corresponding column of the structured input file 118 and include that number and the type of PII as aggregated results data. Alternatively, the results aggregation component 124 may determine a corresponding portion of the values in the corresponding column of the structured input file 118 and include that number and the type of PII as aggregated results data. For example, if the PII detection data 136 indicates that 85% of the values in a particular column of 100 sampled rows include name PII, the results aggregation component 124 may report that an input file of 1000 rows includes 850 names. Alternatively, if less than the threshold number or percentage of values in a column of the sampled input 126 have been indicated as being PII in the PII detection data 136, the results aggregation component 124 may not data associated with that column in the aggregated results data.

The thresholds used to determine whether to include PII in aggregated results data may be fixed and manually configured or may be dynamically determined based on one or more criteria. The thresholds used to determine whether to include PII in aggregated results data may be periodically adjusted and/or adjusted based on one or more detected conditions and/or triggers. The thresholds used to determine whether to include PII in aggregated results data may also, or instead, be based on an accuracy of one or more PII detection models that may be implemented to determine PII in the sampled data (e.g., the PII detection machine-learned model 135 of the PII detection component 128). The aggregated results data may be provided as PII detection output 138 to a PII detection output interface executed by a computing resources or device.

As noted, the PII detection component 128 may perform one or more operations to determine the PII content of the sampled input 126. An input standardization component 130 may be configured at the PII detection component 128. The input standardization component 130 may modify the sampled input 126 using the header information associated with the sampled input 126 to generate standardized input 132.

The sampled input 126 may be in one file format and/or file structure from among a wide variety of possible formats and structures. For example, the sampled input 126 may be in a comma-delimited file format, a spreadsheet file format, a database table format, etc. As will be appreciated, each such formats have particular data organization structures, data orders, etc., that may differ from other file formats. The input standardization component 130 may generate the standardized input 132 such that the input to a PII analysis component 133, which may be configured with a PII detection operations component 134 and/or the PII detection machine-learned model 135, is in a consistent format and organization. For example, a first file format may use a data order of "name," "birthdate," and "phone number," and a second file format may use a data order of "phone number," "birthdate," and "name." The input standardization component 130 may reorder this data for either such file format as "name," "phone number," and "birthdate" in the standardized input 132. The input standardization component 130 may also include standardized labeling and formatting of PII type identifying information and/or other data as described in more detail herein. In this way, the efficiency of the operations performed by component 134 and/or model 135 may be increased because the operations and model may be executed (and, for the model, trained) using a single format of input data, thus reducing the need for inefficient operations for determining a type of PII and other data that may be more explicitly provided in the standardized input data. The PII detection operations component 134 and/or the PII detection model 135 may process the standardized input to determine PII represented in the standardized input. The resulting PII detection data 136 may be provided to the scanning component 120 for results aggregation.

In various examples, the PII detection operations component 134 may perform one or more PII detection operations, for example, using pattern matching techniques, keyword matching techniques, and/or one or more other PII detection techniques, to determine PII represented in the standardized input and to determine PII detection results. Additionally, or alternatively, the PII detection model 135 may be executed using the standardized input as model input to determine PII represented in the standardized input and to determine PII detection results. The results determined by the PII detection operations component 134 may be used by the PII detection machine-learned model 135 in determining PII, and vice versa. Alternatively or additionally, the results determined by the PII detection operations component 134 may be aggregated or otherwise combined with the results determined by the PII detection machine-learned model 135 to determine the PII detection data 136. In particular examples, the distinct results of each PII determination technique (e.g., model and other operations) may be provided as the PII detection results (e.g., results from the PII detection model 135 unmodified or otherwise not altered based on results from the PII detections operations component 134 and vice versa). This combined PII detection results data may be provided as the PII detection data 136 to the scanning component 120 for results aggregation.

The PII detection machine-learned model 135 may be a model trained at a machine-learned model training system 142. The training system 142 may receive training data 144 that may be synthetic and/or user data that may include PII. For example, the data in the training data 144 may be data collected from actual users and/or data generated by one or more computing systems and/or manually and that may be similar to actual user data.

A training data standardization component 146 may, in some examples similar to the input standardization component 130, standardize the training data 144 to generate standardized training data 148. This standardized training data may then be used to train a model to detect PII at a model training component 150. The resulting trained model 152 may be provided to the PII detection component for use as, or as part of, the PII detection machine-learned model 135. As with the inferentially executed model 135, the use of standardized training data may increase the efficiency of training the model 152 because the model 152 may be trained using a single format of training data, thus reducing the need for inefficient operations resulting from training using a variety of training data formats.

An illustrative example will now be described in reference to FIG. 1. An operator may have a need to determine the quantity and types of PII that a particular customer is storing in the operator's cloud information storage system. This need may be based on regulatory requirements, standards compliance requirements, a request from the customer, internal auditing, etc. The operator may provide the one or more input file(s) 102 representing the customer's stored data to the PII detection system 104. The preprocessing component 106 may determine one or more structured input files, such as structured input file 118, and one or more unstructured input files, such as unstructured input file 112, from among the input file(s) 102 using the file type detection component 108 and/or the header detection component 110 as described herein. The preprocessing component 106 may provide the unstructured input files to the unstructured data processing system 114 and the structured input files to the scanning component 120.

The scanning component 120 may use the sampling component 122 to determine sampled input 126 that may represent a subset of the data included in the structured input file 118 and header data associated with the file 118. The PII detection component 128 may, using the input standardization component 130, determine standardized input 132 that the PII analysis component 133 (e.g., using the PII detection operations component 134 and/or the PII detection machine-learned model 135) may use to detect PII in the standardized input 132. The PII analysis component 133 may generate model output as the PII detection data 136 that it may provide to the scanning component 120. The scanning component 120, using the results aggregation component 124, may determine aggregated data indicating the types and quantities of PII represented in the structured input file 118 using the results aggregation techniques described herein.

The aggregated results data may be provided to the PII detection output interface 140 as PII detection output 138 that may indicate the types and quantities of PII represented in a particular file associated with the particular customer for which the operator is determining PII information. The PII detection output interface 140 may be presented to the operator and/or another user or stored for future reference.

The systems and methods described herein may be faster, more efficient, and more robust than conventional systems and methods, as they may facilitate efficient PII detection for stored data files by reducing the processing and memory resources required to determine PII in structured data files and more efficiently providing unstructured data files to a suitable PII detection system. That is, the systems and methods described herein provide a technological improvement over existing PII determination processes that involve evaluating individual pieces of data for PII regardless of the type of file within which such data is stored, increasing the speed and efficiency of such operations. Moreover, the systems and methods described herein provide a significant data accuracy improvement because PII is determined using efficiently trained and executed machine-learned models that increase the accuracy of PII detection, while false positive and false negative PII detections are both greatly reduced.

By identifying and processing structured data files using sampled and standardized data representing the data in such structured data files, processing requirements for requests for PII information associated with a such files are reduced because the sampling significantly reduces the quantity of data processed and the standardization of the sampled data reduces the complexity of such processing. The results data aggregation techniques described herein further increase the efficiency of the disclosed systems and methods because accurate data is presented while inaccurate data is eliminated before presentation on an interface, thereby reducing the processing and memory requirements of the present systems and methods even further over conventional techniques. Accordingly, fewer storage resources and fewer processing resources are required to determine PII using these systems and methods and fewer network resources are needed to transmit and receive associated data.

FIGS. 2-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
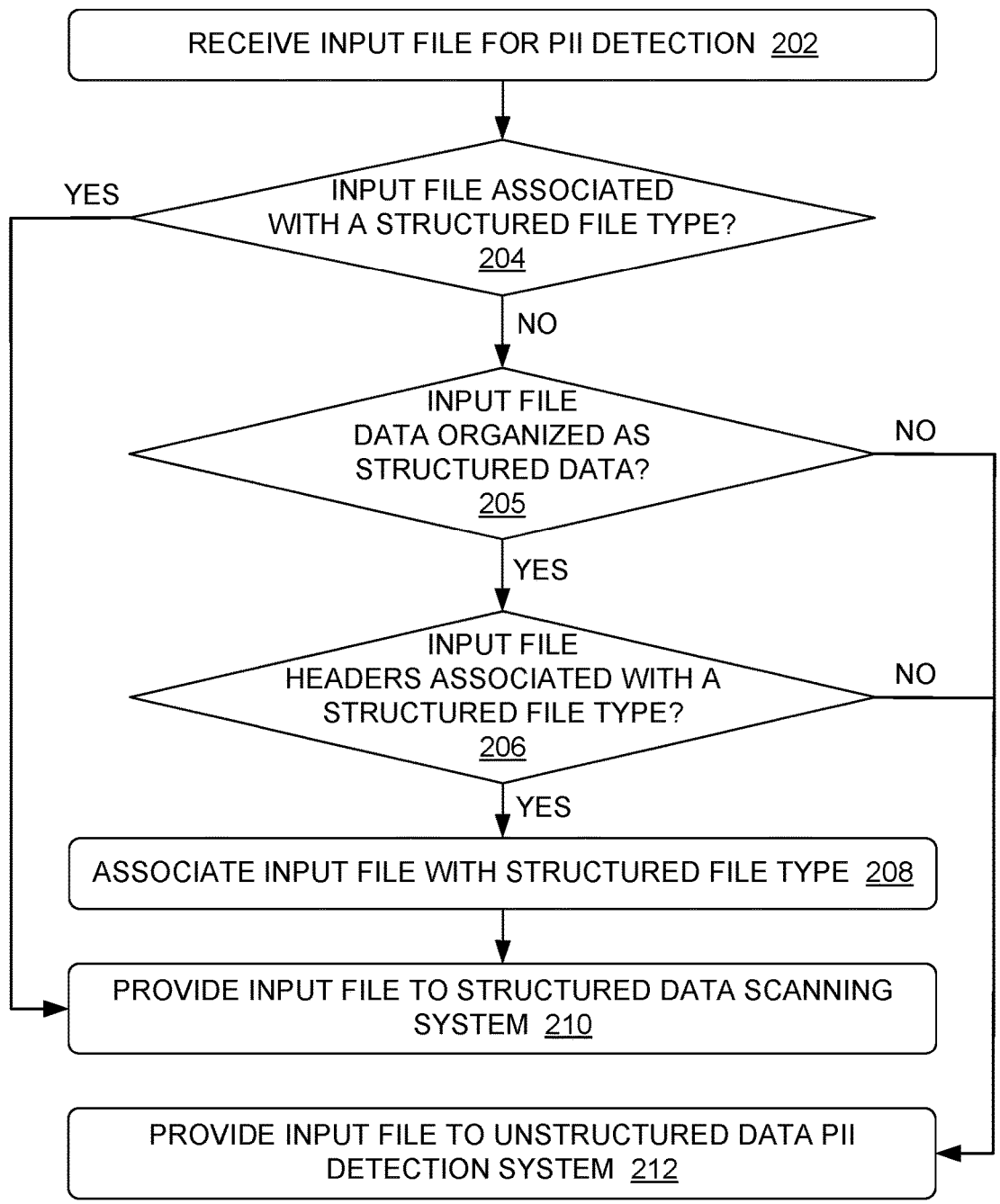
FIG. 2 illustrates a flow diagram of an example method for determining an input file type and a suitable PII detection system to which send the input file for PII detection processing.

FIG. 2 is a flow diagram of an illustrative process 200 to determine whether a received input file is a structured data file and, based on that determination, determine a particular PII detection system to which the input file should be provided for PII detection processing. The process 200 may be described at times with reference to the environment 100 and may be performed by the PII detection system 104, and in some examples by the preprocessing component 106 of the PII detection system 104, but the process 200 may also, or instead, be performed in other similar and/or different environments by other similar and/or different systems.

At 202, an input file may be received at a PII detection system, such as the PII detection system 104. In some examples, the PII detection system may include a preprocessing component, such as the preprocessing component 106, that may receive the input file. The input file received may be any type of data file that may contain and/or be associated with any type of data, including PII.

At 204, the PII detection system may determine whether the input file is associated with a known file type, for example, based on one or more explicit indications. For example, a file type detection component (e.g., component 108 of FIG. 1) of the PII detection system may determine whether the input file has, or is associated with, a label, name, metadata, and/or other explicit indication of a structured file type, such as an indication of a MIME type associated with the input file and/or a file extension (e.g., ".csv," ".xls," ".xlsx," ".json," etc.). If a MIME type, extension, or other explicit indication of a file type is determined, the PII detection system and/or file type detection component may further at 204 determine whether this file type is a structured file type. If, at 204, the file type of the input file is determined to be a structured file type based on an explicit indication, the input file may be provided to a structured data scanning system (e.g. scanning component 120 of FIG. 1) at 210 for further PII detection processing.

If, at 204, the file type of the input file is unable to be determined to be a structured file type using an associated explicit indication (e.g., the file type is not known to be structured or may be structured or unstructured (e.g., ".csv")), the input file may be further analyzed at 205 to determine whether the input file data is organized, for example, as structured data. For example, at 205 the system may determine whether the data contained in the input file is organized as a table of data or uses a form of data structure for organizing the data represented in the file. If so, the PII detection system may perform header evaluation of the input file at 206. If, at 205, the PII detection system determines that the data contained in the input file is not organized as a table of data or does not otherwise appear to use some form of data organization that may be associated with a structured data file type, the system may provide the input file to an unstructured data PII detection system (e.g. unstructured data processing system 114 of FIG. 1) at 212 for unstructured data processing.

At 206, the PII detection system may determine whether the input file includes headers or header data that may be associated with a structured file type. The PII detection system may analyze the data contained in or associated with the file to determine if header data is represented in the file. In some examples, one or more of the operations associated with the process 300 of FIG. 3 and/or other header detection operations described herein may be performed at 206.

If potential header data in the input file sufficiently satisfies the header detection criteria used at 206, in some examples, a particular structured file type may be determined based on such header data at 208. At 210, the input file may be provided to a structured data scanning system (e.g. scanning component 120 of FIG. 1) for further PII detection processing. In other examples, 208 may be omitted and the input file may be provided to a structured data scanning system based on determining that the input file may be a structured file type based on its header data.

If the input file does not have header data or otherwise fails to sufficiently satisfy the header detection criteria used at 206, the input file may be provided to an unstructured data PII detection system (e.g. unstructured data processing system 114 of FIG. 1) at 212 for unstructured data processing.

Figure 3:
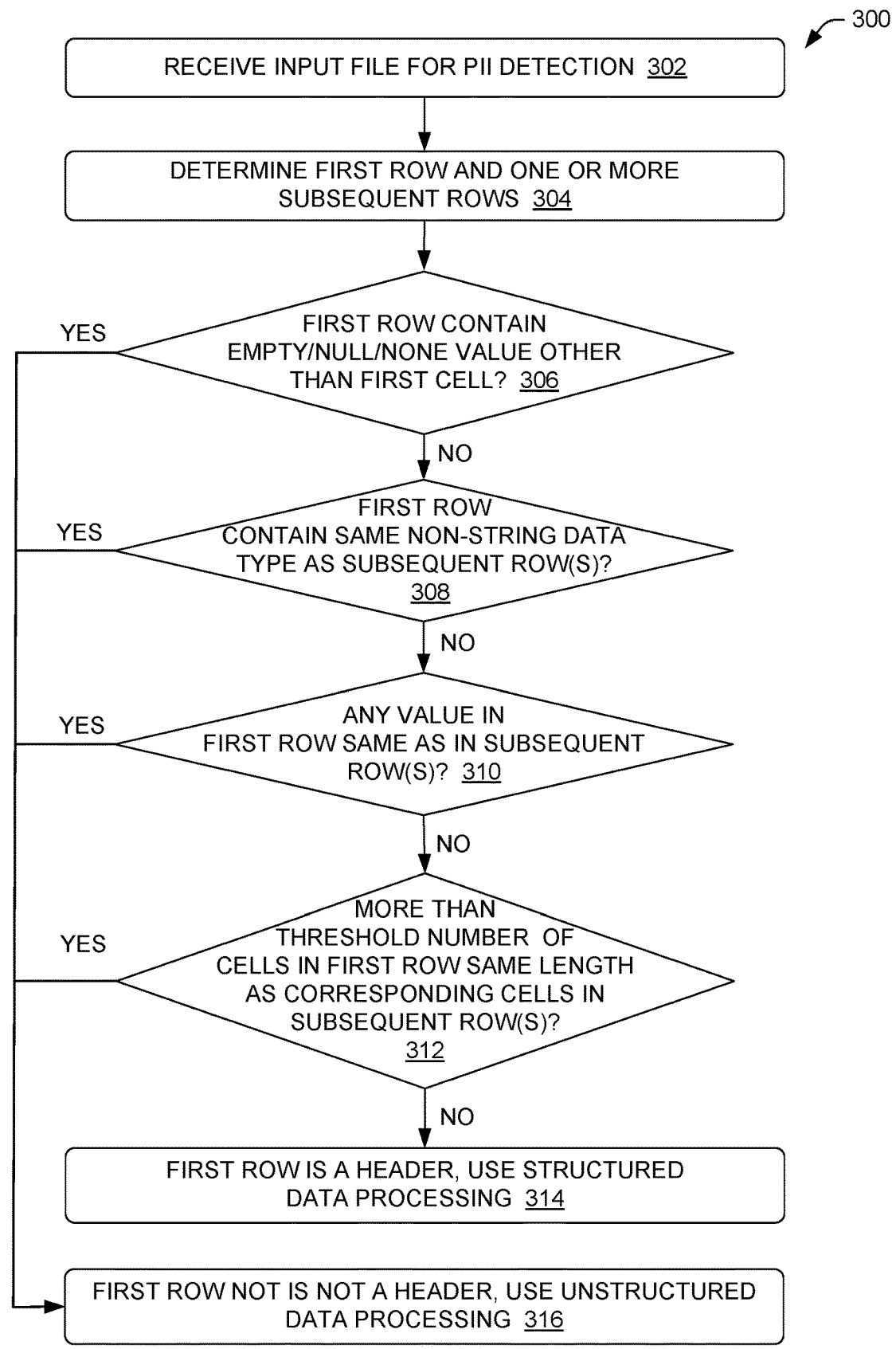
FIG. 3 illustrates a flow diagram of an example method for determining an input file type based on potential header information contained in the input file.

FIG. 3 is a flow diagram of an illustrative process 300 to determine whether a received input file is a structured data file using data associated with the file to determine whether the file contains header data. The process 300 may be described at times with reference to the environment 100 and may be performed by the PII detection system 104, and in some examples by the preprocessing component 106 and/or the header detection component 110 of the PII detection system 104, but the process 300 may also, or instead, be performed in other similar and/or different environments by other similar and/or different systems.

At 302, an input file may be received for PII detection. The input file received may be any type of data file that may contain and/or be associated with any type of data, including PII. In various examples, the input file may be received at a header detection component (e.g., header detection component 110 of FIG. 1) configured at a preprocessing component or system. The input file may be provided to such a component and/or the operations of process 300 may be performed based on not determining an explicit indication of a structured file type associated with the input file.

At 304, a first row and/or one or more subsequent rows of the input file may be determined. A "row" of an input file as used herein may refer to a row or horizontal set of cells, a row or horizontal set of data, a row or horizontal set of data storage units, etc., where the data storage units in a row or horizontal set or associated with one another (e.g., horizontally) based on the organizational structure of the file. Similarly, a "column" of an input file as used herein may refer to a column or vertical set of cells, a column or vertical set of data, a column or vertical set of data storage units, etc., where the data storage units in a column or vertical or associated with one another (e.g., column or vertically) based on the organizational structure of the file. In examples, values of cells or data storage units in a particular column may be associated with a same data type and may represent a same data value type, while values of cells or data storage units in a particular row may be associated with a different data types and may each represent a different data value type.

At 306, the first row may be evaluated to determine if cells in that row contain null data, values of "none," are empty, or are otherwise devoid of substantive data. In some examples, the first cell or data storage unit in such a row may be excluded from this evaluation because the first cell in a header row may be typically left empty or null due to the values in the column under the first cell often being used for index values that index rows of substantive data. Alternatively, this first cell may include a value indicating that it represents column of index values. If there are empty or null cells in the first row (other than the first cell), the first row is likely not a header. If, at 306, it is determined that there are empty or null cells in the first row other than the first cell, the process 300 may proceed to 316, where a determination is made that the first row is not a header, and therefore the input file may be processed using unstructured data processing operations.

In some examples, a threshold for empty or null cells may be used to determine whether a candidate header row is actually a header. For example, a candidate header row (e.g., first row) of an input file may be determined to not be a header row if more than a threshold percentage (e.g., 10%, 25%, 50%, etc.) of the cells in the candidate header row are empty or have null values. Alternatively or additionally, a candidate header row (e.g., first row) of an input file may be determined to not be a header row if more than a threshold number (e.g., 1, 2, 3, 4, etc.) of the cells in the candidate header row are empty or have null values. If, at 306, it is determined that there are a sufficient (e.g., threshold) number or percentage of empty or null cells in the first row other than the first cell, the process 300 may proceed to 316, where a determination is made that the first row is not a header, and therefore the input file may be processed using unstructured data processing operations.

If, at 306, it is determined that there are no empty or null values in the cells of a first row or a candidate header row of the input file (in some examples other than the first cell), or if it is determined that fewer than a threshold percentage or number of such cells are empty or have null values, the process 300 may proceed to 308.

At 308, the types of data included in the cells of a first row or a candidate header row of the input file may be evaluated to determine if they are the same data type or a different data type than the data types of the corresponding cells in a second or one or more subsequent rows (e.g., other cells in the same column). In examples, cells in a header row may be of a type of data that allows a description of the data that is stored in the cells underneath such header cells (e.g., in the column associated with the header cell). For example, a header may include cells with text or string data types that have the descriptive values of "date," "time," and "total," while the cells underneath such header cells (e.g., in the associated columns) may be cells with the data types of date, time, and number, respectively. If the data type of a cell in the first row of the input file is the same data type as that of a corresponding cell (e.g., below in the same column) in a second or one or more subsequent rows, the first row or candidate header row is less likely to be a header.

In examples, some header cells may be of a string, text, or other data type used for descriptive purposes while the corresponding cells in the same column are also be of a string, text, or similar data type. For example, a header cell with a string value of "name" may be associated with a column of string values used to represent names. In such examples, a threshold quantity or percentage of candidate header cells having a same data type as corresponding cells in a second or subsequent row may be used in determining whether a candidate header row in the input file is a header row. For example, at 308 it may be determined that a candidate header row is not a header row if more than a threshold percentage (e.g., 10%, 25%, 50%, etc.) of the cells in the candidate header row have a same data type as corresponding cells in a second or one or more subsequent rows. Alternatively or additionally, at 308 it may be determined that a candidate header row is not a header row if more than a threshold number (e.g., 1, 2, 3, 4, etc.) of the cells in the candidate header row have a same data type as corresponding cells in a second or one or more subsequent rows.

If, at 308, it is determined that there are one or more (e.g., a sufficient (e.g., threshold) number or percentage of) cells in the first row or candidate header row of the input file that have a same data type as corresponding cells in a second or one or more subsequent rows, the process 300 may proceed to 316, where a determination is made that the first row or candidate header row is not a header, and therefore the input file may be processed using unstructured data processing operations. If, at 308, it is determined that there are no or fewer than a threshold percentage or number of cells in the first row or candidate header row that have a same data type as corresponding cells in a second or one or more subsequent rows, the process 300 may proceed to 310.

At 310, the values represented by the cells or data storage units of a first row or candidate header row of the input file may be evaluated to determine if the first row or candidate header row is a header row. At 310, it may be determined whether the value of the data included in the cells of a first row or a candidate header row of the input is the same or substantially similar to the values of the data represented in the corresponding cells in a second or one or more subsequent rows (e.g., other cells in the same column). As described herein, cells of a header row typically include descriptive data (e.g., string or text data) while cells underneath such header cells (e.g., in the column associated with the header cell) may include substantive (e.g. user) data. For example, a header may include cells with text descriptive values of "date," "time," and "total," while the cells underneath such header cells (e.g., in the associated columns) may be cells with the data values of "Aug. 25, 2022," "08:36:24," and "42," respectively. If the value of a cell in a first row or candidate header row of the input file is the same value as that of a corresponding cell in a second or one or more subsequent rows (e.g., below in the same column), the first row is less likely to be a header.

In some examples, a header cell may have a same value as a corresponding cell in the same column. In such examples, a threshold quantity or percentage of candidate header cells having a same value as corresponding cells in a second or subsequent row may be used in determining whether a candidate header row in the input file is a header row. For example, at 310 it may be determined that a candidate header row is not a header row if more than a threshold percentage (e.g., 10%, 25%, 50%, etc.) of the cells in the candidate header row have a same value as their corresponding cells in a second or one or more subsequent rows. Alternatively or additionally, at 310 it may be determined that a candidate header row is not a header row if more than a threshold number (e.g., 1, 2, 3, 4, etc.) of the cells in the candidate header row have a same value as their corresponding cells in a second or one or more subsequent rows.

If, at 310, it is determined that there are one or more (e.g., a sufficient (e.g., threshold) number or percentage of) cells in the first row or candidate header row of the input file that have a same value as their corresponding cells in a second or one or more subsequent rows, the process 300 may proceed to 316, where a determination is made that the first row or candidate header row is not a header, and therefore the input file may be processed using unstructured data processing operations. If, at 310, it is determined that there are no or fewer than a threshold percentage or number of cells in the first row or candidate header row that have a same value as their corresponding cells in a second or one or more subsequent rows, the process 300 may proceed to 312.

At 312, the length, size, and/or other data dimensions of the values represented by the cells or data storage units of a first row or candidate header row of the input file may be evaluated to determine if the first row or candidate header row is a header row. At 312, it may be determined whether one or more dimensions, such as value length or cell size, of the values stored in the cells of a first row or candidate header row are the same or different than the corresponding dimensions of values stored in corresponding cells in a second or one or more subsequent rows. Because the descriptive data (e.g., string or text data) contained header row cells may typically differ in size or length from the substantive data stored in cells underneath such header cells (e.g., in the column associated with the header cell), if the length or size of data stored in a cell of a first row matches the length or size of data stored in a corresponding cell of a second or subsequent cell (e.g., a cell underneath the first row cell in the same column), the first row is less likely to be a heard row. For example, a header may include a cell with a descriptive string value of "date" having a size of four characters or four bytes, while the cell in the second row in the same column may have a string or date value of "Aug. 25, 2022" having a size of 10 characters or bytes.

In some examples, one or more header cells may have values with the same size or length as the corresponding cells in one or more other rows. In such examples, a threshold quantity or percentage of candidate header cells having a values of the same length or size as values in corresponding cells in a second or subsequent row may be used in determining whether a candidate header row in the input file is a header row. For example, at 312 it may be determined that a candidate header row is not a header row if more than a threshold percentage (e.g., 10%, 25%, 50%, etc.) of the cells in the candidate header row have values of a same length or size as the values in corresponding cells in a second or one or more subsequent rows. Alternatively or additionally, at 312 it may be determined that a candidate header row is not a header row if more than a threshold number (e.g., 1, 2, 3, 4, etc.) of the cells in the candidate header row have values of a same length or size as the values in corresponding cells in a second or one or more subsequent rows.

If, at 312, it is determined that there are one or more (e.g., a sufficient (e.g., threshold) number or percentage of) cells in the first row or candidate header row of the input file that have a same length or size as the values in corresponding cells in a second or one or more subsequent rows, the process 300 may proceed to 316, where a determination is made that the first row or candidate header row is not a header, and therefore the input file may be processed using unstructured data processing operations. If, at 312, it is determined that there are no or fewer than a threshold percentage or number of cells in the first row or candidate header row that have a same length or size as the values in corresponding cells in a second or one or more subsequent rows, the process 300 may proceed to 314 where the input file may be processed, or provided for processing, as a structured data input file as described herein.

Figure 4:
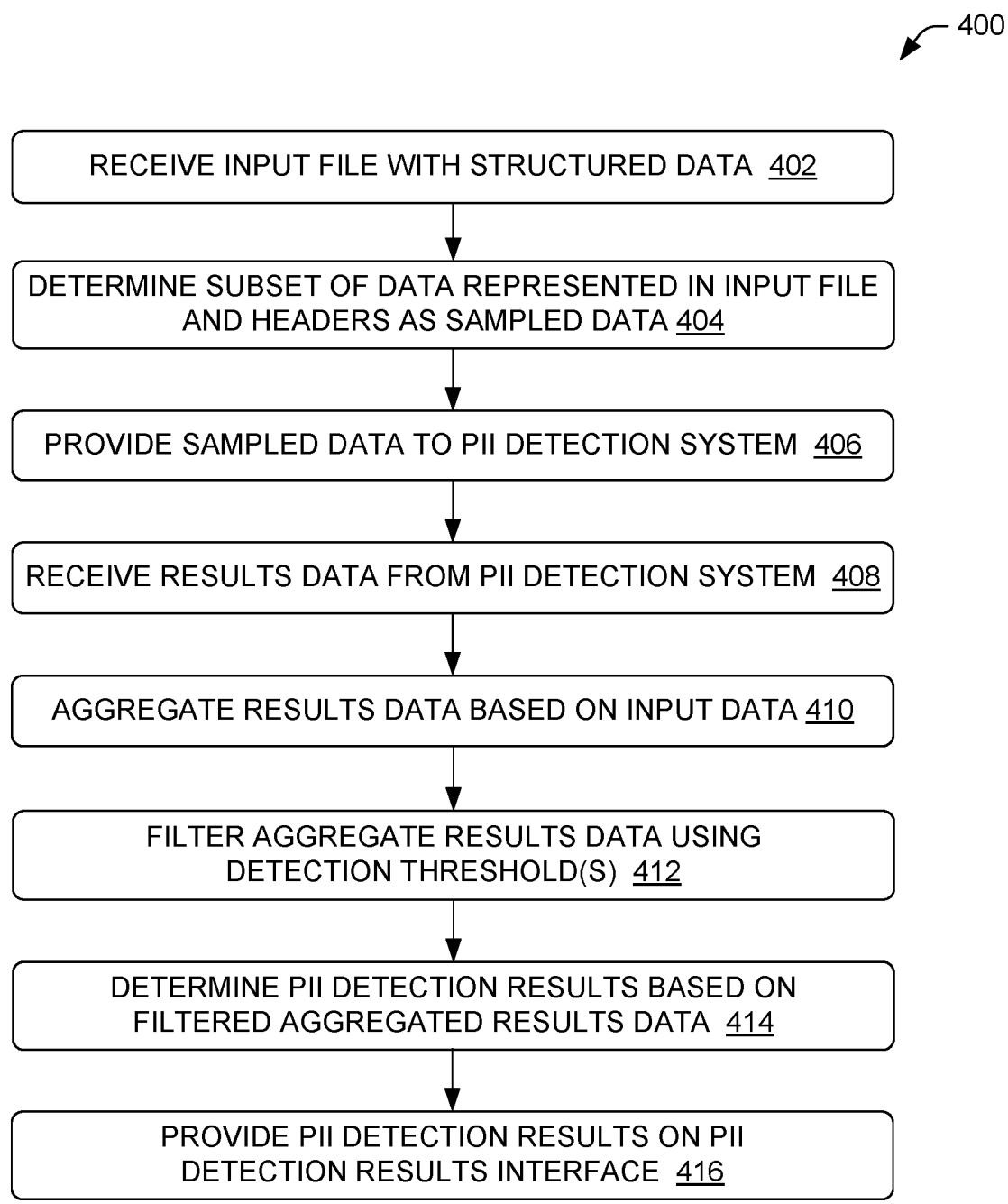
FIG. 4 illustrates a flow diagram of an example method for sampling data in an input file and providing the sampled data to a PII detection system to determine PII represented in the input file.

FIG. 4 is a flow diagram of an illustrative process 400 to determine sampled data for use in performing PII detection operations and to aggregate PII detection results data for presentation on a user interface. The process 400 may be described at times with reference to the environment 100 and may be performed by the PII detection system 104, and in some examples by the scanning component 120 of the PII detection system 104, but the process 400 may also, or instead, be performed in other similar and/or different environments by other similar and/or different systems.

At 402, an input file may be received for PII detection. The input file received may be any type of data file that may contain and/or be associated with any type of data, including PII and may be a structured input file associated with a known structured file type. The received input file may also, or instead, include header data indicating an organization or structure of the input file and/or the data represented therein. In some examples, the structured data input file may be received at a scanning component (e.g., scanning component 120 of FIG. 1) of a PII detection system.

At 404, a subset of the substantive (e.g., non-header) data in the input file may be selected as a sample of the input file. This may be performed by a sampling component (e.g., sampling component 122 of FIG. 1) of a PII detection system. For example, a number of rows of data may be determined as sampled data. Such sampled data rows may be randomly selected or may be selected using various criteria and/or one or more algorithms. A particular percentage or number of such rows may be (e.g., randomly) determined. For example, the number of rows selected as sampled data may be a percentage (e.g., 5%, 10%, 25%, etc.) of the total number of rows in the input file or a particular number (e.g., 5, 20, 100, 250, etc.) of the total number of rows in the input file. The number or percentage of rows selected for sampled data may be manually and/or dynamically configured and/or adjusted based on various criteria and/or conditions. The number or percentage of rows selected for sampled data may also, or instead, be based on an accuracy of one or more PII detection models that may be implemented to determine PII in the input filed based on the sampled data. For example, a more accurate model may be able to estimate a quantity of a PII in an input file using less sampled input data than a less accurate model. Also at 404, the header data from the structured input file may also be included with the sampled data.

At 406, the sampled data may be provided to a PII detection system or component (e.g., PII detection component 128 of FIG. 1) that may use the sampled data to estimate or otherwise determine PII associated with the input file using one or more PII detection operations. In some examples, as described herein, the PII detection system or component may execute a machine-learned model to make this determination. At 408, the results of the PII detection operations may be received. These results may be in any suitable form or format and may indicate quantities and/or types of PII discovered or otherwise determined from the sampled data provided at 406. Such results may be received at, and other PII detection results operations may be performed by, a results aggregation component (e.g., results aggregation component 124 of FIG. 1) configured at a PII detection system.

At 410, the results received at 408 may be aggregated to determine estimated PII quantities and/or types associated with the input file. For example, the results received at 408 may indicate that 90% of values in substantive (e.g., non-header) cells in the sampled data associated with the "name" header cell (e.g., in the "name" column) include names, while 5% of values in substantive (e.g., non-header) cells in the sampled data associated with the "telephone number" header cell (e.g., in the "telephone number" column) include telephone numbers. At 410, a number of values contained in the input file associated with PII may be determined based on the results received at 408. To continue this example, if there are 1000 values in each of the name and telephone number columns of the input file, at 410 it may be determined that there are 900 (e.g., 90% of 1000) names in the input file and 50 (e.g., 5% of 1000) telephone numbers. Alternatively, for any results that indicate any number of PII in the sampled data, at 410 the total number of values in that column may be included in the aggregated data. To continue with the example, at 410 1000 names and telephone numbers may be associated with the aggregated data.

At 412, the aggregated data may be filtered based on one or more PII detection thresholds. In some examples, if there is not a sufficient number of results associated with a particular type of PII, that type PII may not be reported. These thresholds may be manually and/or dynamically configured and/or adjusted based on various criteria and/or conditions. Such thresholds may also, or instead, be based on an accuracy of one or more PII detection models that may be implemented to determine PII in the input filed based on the sampled data.

For example, to continue the example above, if 90% of the values in the sampled data that are associated with the name column were determined to be names and 5% of the values in the sampled data that are associated with the telephone number column were determined to be telephone numbers, at 412 a threshold may be applied to determine whether to report such PII detections data. If the threshold is set at 75%

(e.g., 75% of the cells in a column in sampled data must contain detected PII), then at 412 the telephone number results may be filtered from the PII detection results while the name results may be included.

At 414, the PII detection results may be determined based on the filtered aggregated results determined at 410 and 412. The PII detection results may be determined to provide an indication of the one or more types of PII detected and corresponding (e.g., estimated) quantities of such PII. To continue the example above, the results may include an indication of "name" and a quantity of 1000 names if total quantity of potential PII in the input file is to be reported. If PII is to be reported proportionally (e.g., based on the percentage of PII determined in the sampled data), the results may include an indication of "name" and a quantity of 900 names based on 90% of the sampled data associated with the name column being reported to contain PII (e.g. in the results received at 408). No actual PII may be included in such results data, thereby avoiding exposure of PII while still providing PII information that may be relevant to an operator of the PII detection system. At 416, the PII detection results may be provided to one or more computing resources or devices and/or stored, for example, for presentation in a user interface and/or for use in generating other output.

Figure 5:
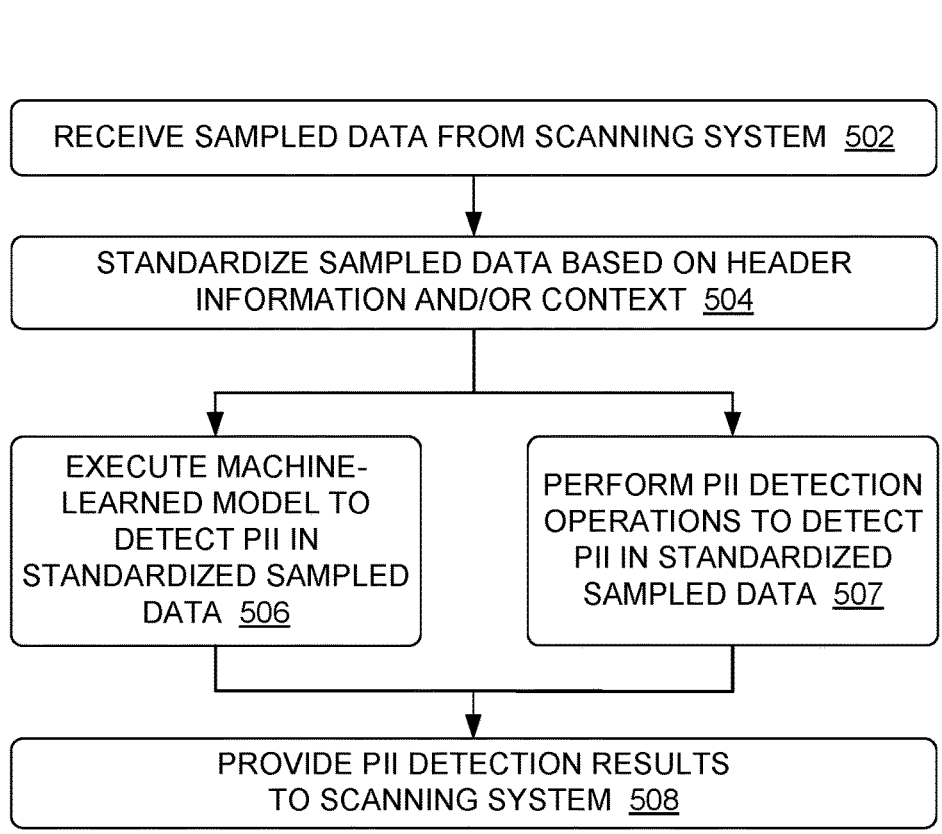
FIG. 5 illustrates a flow diagram of an example method for standardizing sampled data for use in executing a machine-learned PII detection model and/or performing other PII detection operations.

FIG. 5 is a flow diagram of an illustrative process 500 to determine standardized sampled data and determine PII in the standardized sampled data using a machine-learned model. The process 500 may be described at times with reference to the environment 100 and may be performed by the PII detection system 104, and in some examples by the PII detection component 128 of the PII detection system 104, but the process 500 may also, or instead, be performed in other similar and/or different environments by other similar and/or different systems.

At 502, sampled input data may be received, for example from a sampling component of a PII detection system at a PII detection component (e.g., PII detection component 128 of FIG. 1). The received sampled input data may include a header and/or header data and may be based on a structured data file.

At 504, the sampled input data may be standardized for use as input to a machine-learned model, for example at an input standardization component (e.g., input standardization component 130 of FIG. 1). There may be many different structured file formats and ways that data may be organized in structured data files and these formats may be represented in the sampled input data. At 504, the data from such files may be organized into a standard format for processing by the machine-learned model.

For example, a first particular type of file may indicate an address (e.g., as a data entry in a sampled input file) as:
 street address
 15 Ranya Lane
while a second particular type of file may indicate the same address as:
 {
 "street address": 15 Ranya Lane
 }
Both such entries indicate the street address header information and the street address value but are differently formatted. In order to standardize such input and increase machine-learned model execution efficiency, either of such entries may be standardized into:
 STREET ADDRESS: 15 Ranya Lane;
In various examples, each substantive entry in a sampled input file may be standardized to include a header value and the cell value for each substantive value. In the example above, the standardized input may include "STREET ADDRESS:" with each entry that is associated with the street address column.

For input files associated with multilayered structured data types, the standardized entries may be concatenated to capture surrounding context. For example, a sampled input file may include a multilayered entry such as:
 "EMPLOYEES":
 "ID": "1"
 "Name": "James Smith"
This entry may be standardized and concatenated at 504 as:
 EMPLOYEES_ID: 1; EMPLOYEES_NAME: James Smith;
In such examples, the header data from different layers may be connected using one or more special characters, such as an underscore as seen above.

At 506, the standardized sampled data may be provided to a machine-learned model trained to detect PII using such standardized data as input (e.g., PII detection machine-learned model 135 of FIG. 1) and results from the model may be received. Such a model may be trained as described herein by a model training system (e.g., machine-learned model training system 142 of FIG. 1) using training data that has been standardized in the same or a similar manner as described above in regard to 504.

In various examples, one or more other PII detection operations may be performed at 507 in addition to, or instead of, executing a machine-learned model trained to detect PII at 506. For example, at 507, one or more PII detection operations that use one or more pattern matching techniques, one or more keyword matching techniques, and/or one or more other PII detection techniques may be performed to determine PII represented in the standardized data. In some examples, the results of such PII detection operations at 507 may be used by a model (e.g., at 506) to determine PII in the standardized data and/or the results of executing a machine-learned model trained to detect PII at 506 may be used by one or more PII detection operations (e.g., at 507) to determine PII in the standardized data. The results determined at 506 and 507 may be aggregated or otherwise combined and provided as the PII detection results data used at 508.

The results of the PII detection operations of 506 and/or 507 (e.g., performed by a model or otherwise) may include indications of quantities and/or types of PII discovered or otherwise determined in the standardized sampled data generated at 504. At 508, the PII detection results generated as output by the model may be provided to a scanning system and/or other components of a PII detection system for further processing.

Figure 6:
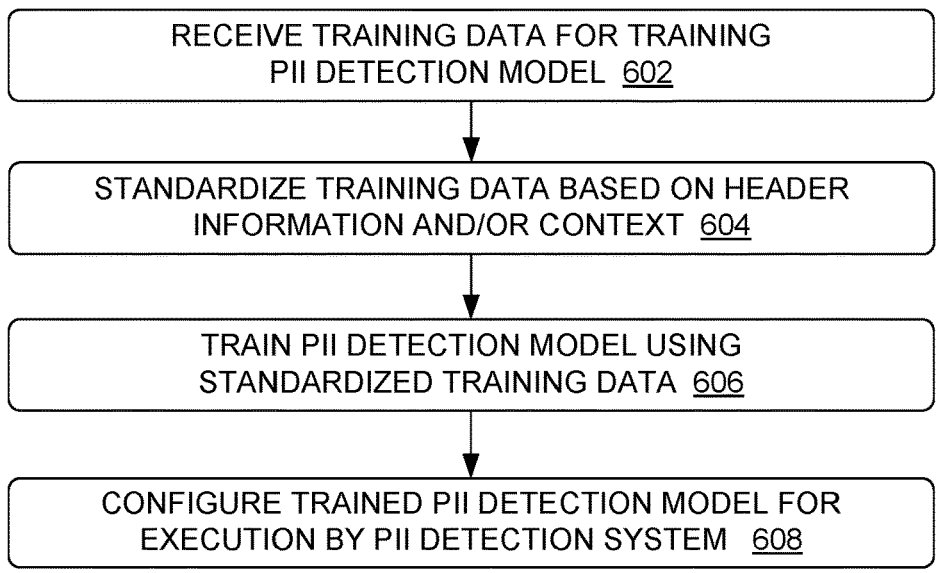
FIG. 6 illustrates a flow diagram of an example method for training a machine-learned PII detection model using standardized training data.

FIG. 6 is a flow diagram of an illustrative process 500 to determine standardized training data and to train a machine-learned model using such standard training data to determine PII in model input data. The process 600 may be described at times with reference to the environment 100 and may be performed by the machine-learned model training system 142, but the process 600 may also, or instead, be performed in other similar and/or different environments by other similar and/or different systems.

At 602, training data may be received, for example at a machine-learned model training system (e.g., machine-learned model training system 142 of FIG. 1). The training data may include substantive data and/or header data and may be based on or formatted to resemble a structured data file. The training data may be synthetic data generated for machine-learned model training purposes that may include data resembling PII, substantive and/or real-world data (e.g., user data collected from an operational environment) that may include PII, or a combination thereof.

At 604, the training data may be standardized for use as input to a machine-learned model training system, for example at a training data standardization component (e.g., training data standardization component 148 of FIG. 1). This standardization operations performed at 604 may be the same or substantially similar to those used to standardize sampled input data at operation 504 of the process 500 described above. At 606, the model may be trained using this standardized training data. In some examples, a model may be iteratively trained, using data generated as output by the model as training data for a future iteration model training. Once trained, the machine-learned model may be configured at 608 for execution in a PII detection system for detecting PII in, for example, sampled and/or standardized input data.

FIGS. 7 and 8 are representations illustrating exemplary data, such as input file data and PII detection results data, that may be processed and/or determined using the disclosed session identifiers and systems and methods. The data illustrated in these figures may be described at times with reference to the environment 100 and the PII detection system 104, but this data may also, or instead, be processed and/or determined in other similar and/or different environments by other similar and/or different systems.

FIG. 7 illustrates a representative input file 700. The input file 700 may be a structured data file. The file 700 may include a header row 720 that includes descriptive values for each of the columns 712, 714, 716, and 718 of the input file 700. The header row 720 may not include a descriptive value for the column 710 as that column may include index data for the substantive rows 722. The substantive rows 722 may be the rows in the input file 700 that are not header rows and that may include substantive (e.g. non-header) data.

The columns 712, 714, 716, and 718 may be associated with first names, last names, phone numbers, and email addresses as shown here and indicated by the header row 720. The data in columns 712, 714, 716, and 718 may or may not include PII that corresponds to their respective headers. For example, the data in the rows 722 in column 712 may be all or mostly first names, the data in the rows 722 in column 714 may be all or mostly last names, and the data in the rows 722 in column 718 may be all or mostly email addressed. However, the data in the rows 722 in column 716 may not be all or mostly phone numbers, despite the header value of "phone number" associated with column 716. Therefore, the data in this column may be filtered out of the aggregated data reported to as PII detection results as described herein.

For example, FIG. 8 illustrates representative PII detection results 800 that may be presented in a user interface. The results 800 may be based on performing one or more PII detection operations as described herein on an input file such as input file 700. The results 800 may include a PII detected section 810 that may list quantities and types of PII detected. For example, for the input file 700, the quantities of detected first names, last names, and email addressed may be indicated, along with the type of PII detected and/or the columns in which such PII was detected. However, the quantities of detected phone numbers may not be included in the section 810 as those results may have been filtered out of the detection results based on having too little detected PII in the phone number column (e.g., less than a threshold percentage of PII) as described herein.

The results 800 may include a processing details section 820 that may provide data regarding the PII detection processing and operations performed to determine the results presented in the section 810. For example, the section 820 may indicate a version or type of the various components that may have performed one or more of the PII detection operations, a version or type PII detection model used, a time of initiate of the PII detection process, the amount of time taken to complete the process, the size and/or other attributes of the input file, etc.

Figure 9:
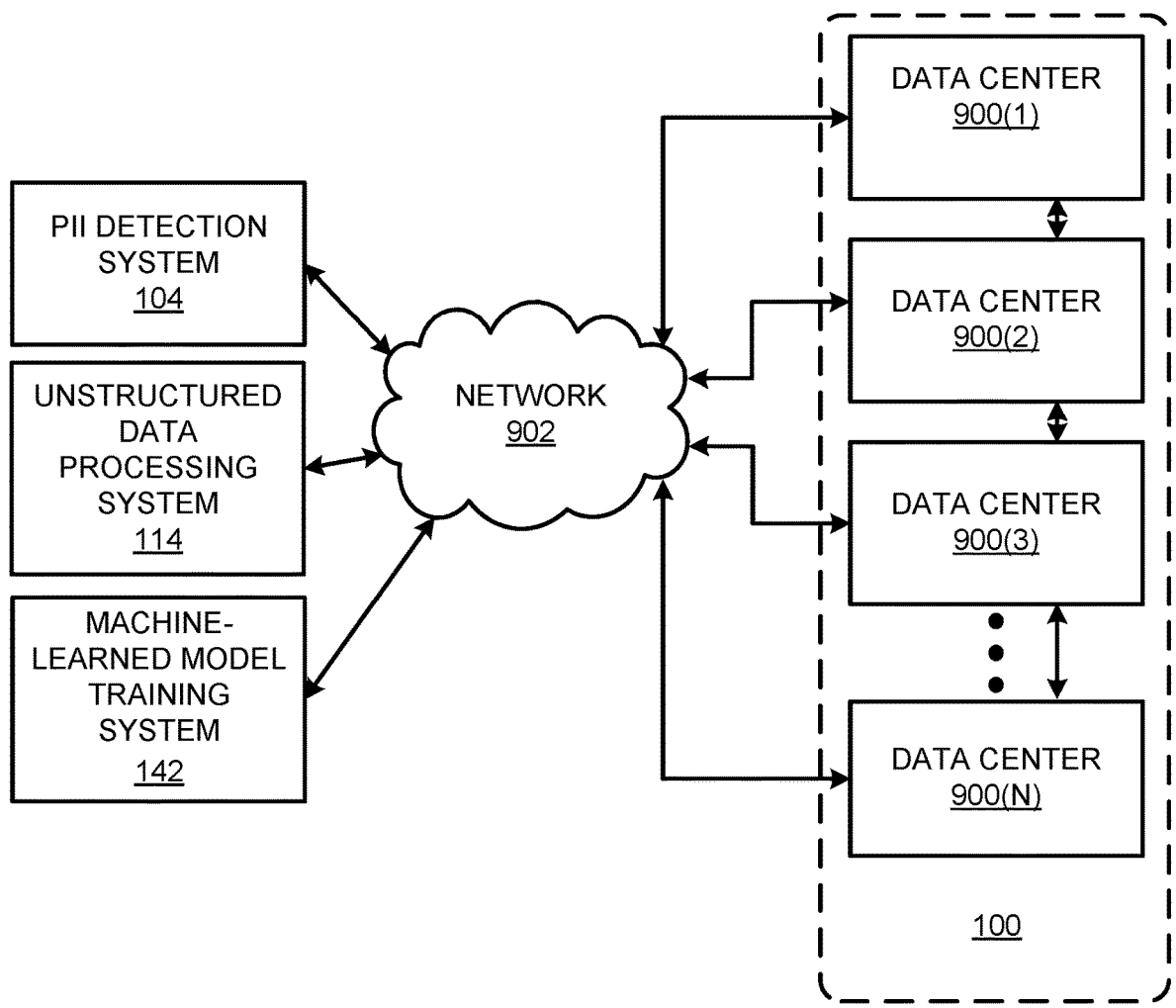
FIG. 9 is a system and network diagram that shows an illustrative operating environment that includes a system that can be configured to implement aspects of the functionality described herein.

FIG. 9 is a system and network diagram that shows an illustrative operating environment that includes a PII detection system 104, an unstructured data processing system 114, and a machine-learned model training system 142 that can be configured to implement aspects of the functionality described herein. The systems 104, 114, and 142 can each execute and/or implement various types of computing and network services, such as the data storage and data processing, and/or utilize various computing resources of various types of systems on a permanent or an as-needed basis. Among other types of functionality, the computing resources utilized and/or implemented by the systems 104, 114, and 142, or by a larger system of which one or more of these systems may be a part, can be utilized to implement the various PII detection operations and model training operations described herein. One or more of the systems 104, 114, and 142 may be part of a larger system that provides additional computing resources that include, without limitation, data storage resources, data processing resources, such as virtual machine (VM) instances, networking resources, data communication resources, network services, and other types of resources.

Each type of computing resource utilized and/or implemented at the systems 104, 114, and 142, or by a larger system of which one or more of these systems may be a part, can be general-purpose or can be available in a number of specific configurations. For example, data processing resources can be implemented as physical computers or VM instances in a number of different configurations. The VM instances can be configured to execute applications, including web servers, application servers, media servers, database servers, some or all of the PII detection operations and/or model training operations described above, and/or other types of programs. Data storage resources can include file storage devices, block storage devices, and the like. The systems 104, 114, and 142, or a larger system of which one or more of these systems may be a part, can also be configured to perform other types of operations and/or utilize and/or implement other computing resources not mentioned specifically herein.

The computing resources utilized and/or implement by systems 104, 114, and 142, or a larger system of which one or more of these systems may be a part, may be enabled in one implementation by one or more data centers 900(1), 900(2), 900(3), ..., 900(N) that may be configured in (partially or wholly) and/or communicative connected to the environment 100. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as systems 104, 114, and 142, and/or any of the computing resources in the environment 100, provided by the system over a network 902, which can be a wide area communication network ("WAN"), such as the Internet, an intranet, an Internet service provider ("ISP") network, or a combination of such networks. For example, and without limitation, a computing device (e.g., the PII detection system 104) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
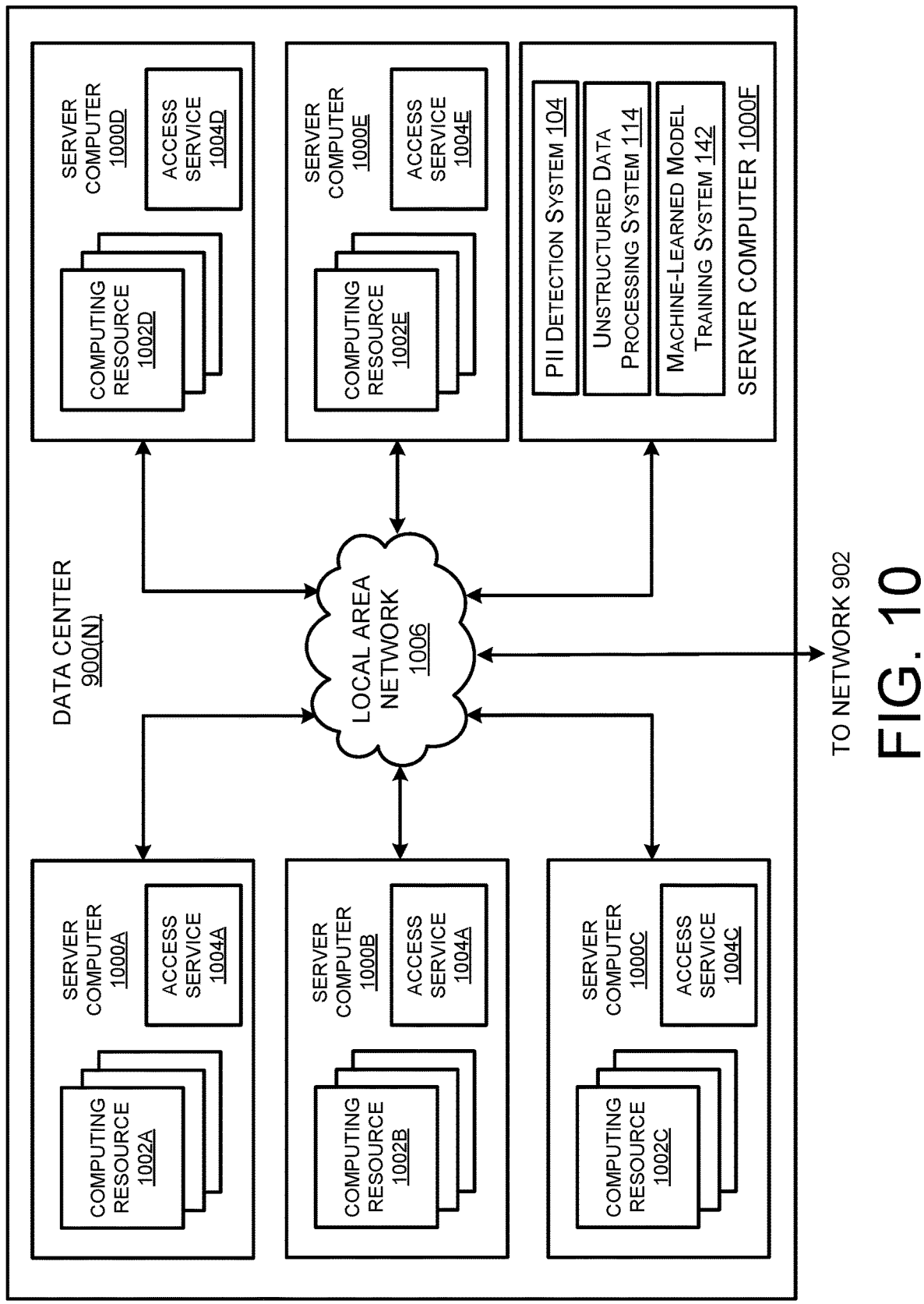
FIG. 10 is a computing system diagram illustrating a configuration for a data center that can be utilized to implement aspects of the technologies disclosed herein.

FIG. 10 is a computing system diagram that illustrates one configuration for a data center 900(N) that can be utilized to implement the systems 104, 114, and/or 142, as described above in FIGS. 1-8 and/or any other PII detection and/or model training system disclosed herein. The example data center 900(N) shown in FIG. 10 includes several server computers 1000A-1000E (collectively 1000) for providing the computing resources 1002A-1002E (collectively 1002), respectively.

The server computers 1000 can be standard tower, rack-mount, or blade server computers configured appropriately for providing the various computing resources described herein (illustrated in FIG. 10 as the computing resources 1002A-1002E). As mentioned above, the computing resources 1002 may be utilized and/or configured at one or more of systems 104, 114, and 142, or a larger system of which these systems may be a part, and can include, without limitation, analytics applications, data storage resources, data processing resources such as VM instances or hardware computing systems, database resources, networking resources, model execution resources, model training resources, and others. Some of the servers 1000 can also be configured to execute access services 1004A-1004E (collectively 1004) capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute one or more of the systems 104, 114, and 142 and/or one or more components associated therewith. The server computer 1000F can also be configured to execute other components and/or to store data for providing some or all of the functionality described herein. In this regard, it should be appreciated that components or different instances of one or more of the systems 104, 114, and 142 can execute on many other physical or virtual servers in the data centers 800 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 900 described with reference to FIG. 10 is merely illustrative and that other implementations can be utilized.

Figure 11:
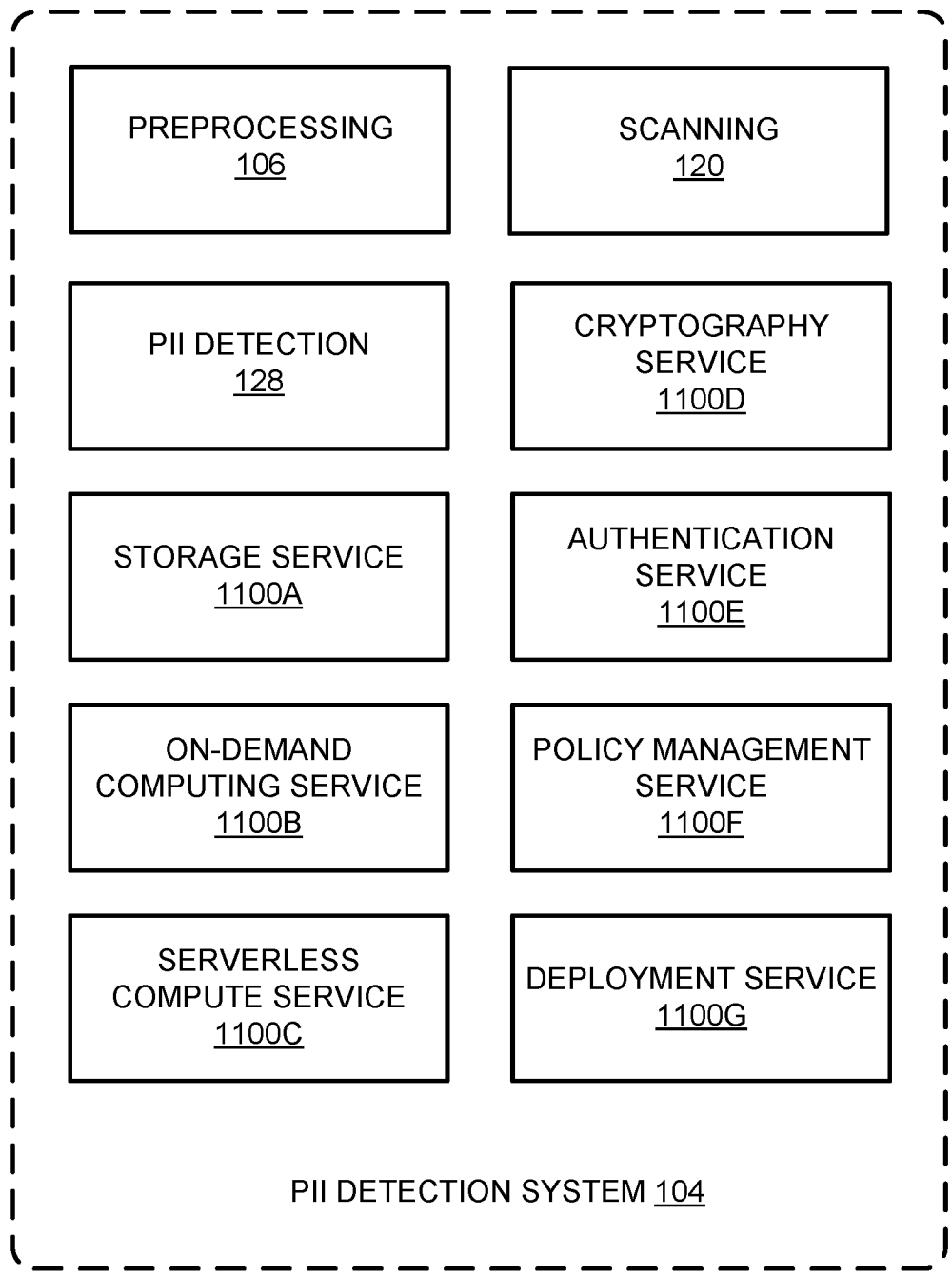
FIG. 11 is a network services diagram that shows aspects of several services that can be provided by and utilized within a system, or a larger system of which the system is a part, which is configured to implement the various technologies disclosed herein.

FIG. 11 is a system services diagram that shows aspects of several services that can be provided by and utilized within the systems 104, 114, and 142 and/or a larger system of which these systems may be a part, which is configured to implement the various technologies disclosed herein. In particular, and as discussed above, these systems, or a larger system of which these systems may be a part, can provide a variety of services to users and other users including, but not limited to, PII detection services performed by preprocessing component 106, scanning component 120, PII detection component 128, and/or one or more computing instances performing one or more functions thereof; a storage service 1100A; an on-demand computing service 1100B; a serverless compute service 1100C; a cryptography service 1100D; an authentication service 1100E; a policy management service 1100F; and a deployment service 1100G. The system, or a larger system of which the system is a part, can also provide other types of computing services, some of which are described below.

It is also noted that not all configurations described include the services shown in FIG. 11 and that additional services can be provided in addition to, or as an alternative to, the services explicitly described herein. Each of the systems and services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system and/or from computing resources in the system, or a larger system of which the system is a part. The data stored by the storage service 1100A can be obtained from computing devices of users. The data stored by the storage service 1100A may also be activity data logged to the storage system 1100A that may be functioning as a logging system or service.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless computer service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionalities not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1100B) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g. API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
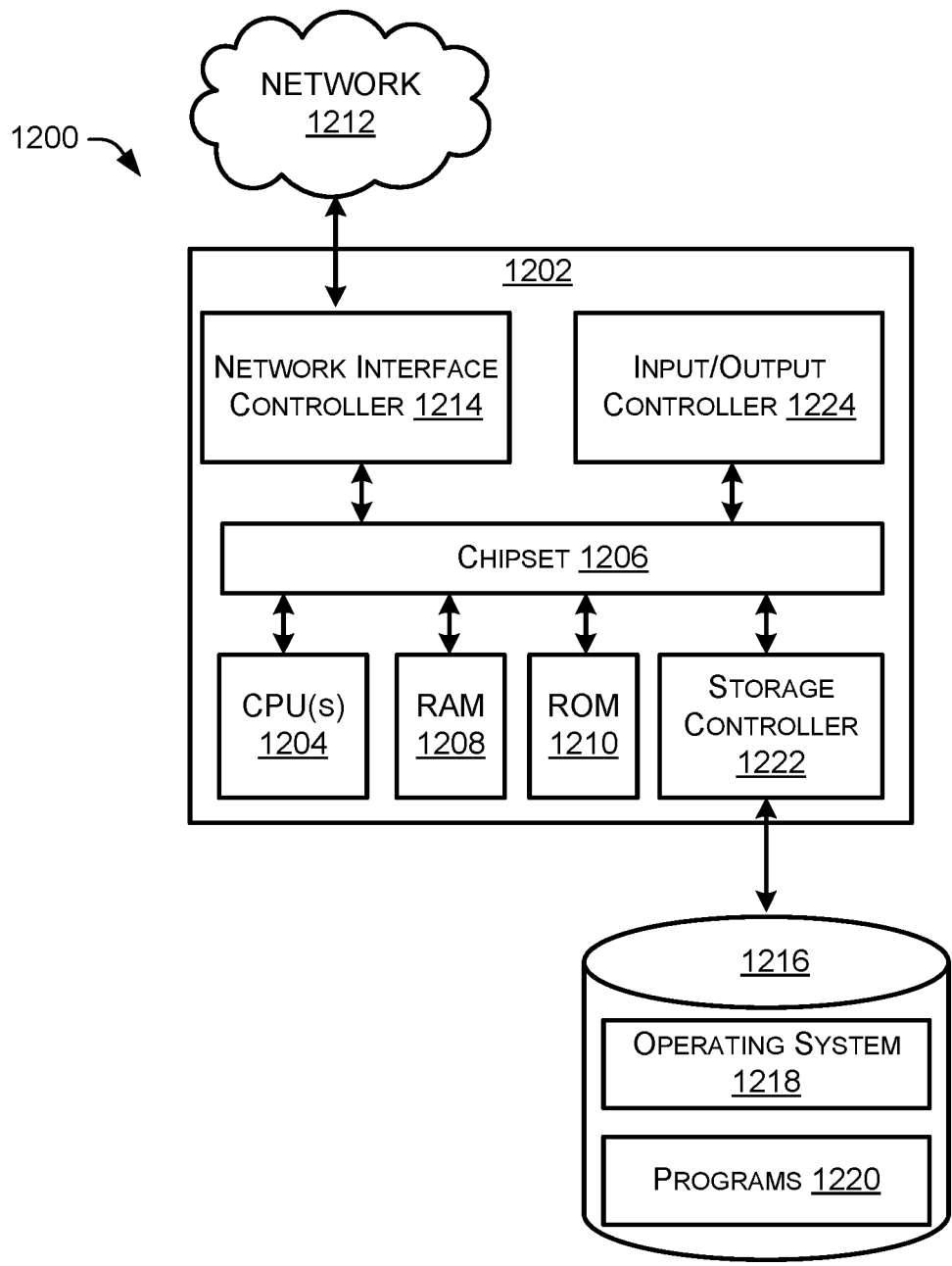
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a PII detection system, a model training system, and/or other systems and components described herein.

The computer 1200 includes a baseboard 1202, or "motherboard," which may be one or more printed circuit boards to which a multitude of components and/or devices may be connected by way of a system bus and/or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1212. The chipset 1206 can include functionality for providing network connectivity through a NIC 1214, such as a gigabit Ethernet adapter. The NIC 1214 is capable of connecting the computer 1200 to other computing devices over the network 1212. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions that, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different from that shown in FIG. 12.

Based on the foregoing, it should be appreciated that technologies for providing closed loop change management services and sorting and retrieving activity data based on a session identifier have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   receiving, at a personally identifiable information detection system, an input file comprising header data indicating one or more types of personally identifiable information and input file data comprising the personally identifiable information;
   determining, by the personally identifiable information detection system and based on the input file, that the input file comprises structured data;
   determining, by the personally identifiable information detection system and based on a random selection of rows of input file data, a subset of the input file data;

determining, by the personally identifiable information detection system and based on the subset of the input file data and the header data, standardized input data comprising one or more values represented in the subset of the input file data and one or more indications of personally identifiable information types corresponding to the one or more values;

executing, by the personally identifiable information detection system and using the standardized input data as input, a machine-learned personally identifiable information detection model to determine personally identifiable information represented in the standardized input data;

determining, by the personally identifiable information detection system and based on the personally identifiable information represented in the standardized input data and the input file data, aggregated personally identifiable information results data representing one or more quantities of personally identifiable information represented in the input file data and one or more of the one or more types of personally identifiable information corresponding to the one or more quantities of personally identifiable information; and transmitting, by the personally identifiable information detection system to one or more computing resources for presentation to a user, the aggregated personally identifiable information results data.

2. The method of claim 1, wherein determining that the input file comprises the structured data comprises:
determining that a first row of data represented in the input file comprises the header data based on one or more of:
determining that the first row of data comprises header data;
determining that a first type of data represented in the first row of data is distinct from a corresponding second type of data represented in a subsequent row of data represented in the input file;
determining that a first value of data represented in the first row of data is distinct from a corresponding second value of data represented in the subsequent row of data; or
determining that at least a threshold number of data storage units of the first row of data have a first size that is substantially similar to a second size of corresponding data storage units of the subsequent row of data; and
determining that the input file comprises the structured data based on the header data.

3. The method of claim 1, wherein determining the standardized input data comprises concatenating a header value of the header data associated with a column of the input file data, a special character, and a data value represented in the column of the input file data.

4. A method comprising:
receiving, at a personally identifiable information detection system, an input file;
determining that the input file comprises structured data;
determining, from the structured data of the input file, that a first portion of the structure data encodes substantive data;
determining, from the structured data of the input file, that a second portion of the structure data encodes descriptive data;
sampling a subset of data represented in the first portion of the structured data of the input file;

determining standardized input data based at least in part on the sampled subset of data represented in the first portion of the structured data of the input file and header data represented in the second portion of the structured data of the input file;
executing a machine-learned personally identifiable information detection model using the standardized input data to determine personally identifiable information represented in the standardized input data; and
determining, based at least in part on the personally identifiable information represented in the standardized input data, aggregated personally identifiable information results data representing the personally identifiable information represented in the input file.

5. The method of claim 4, wherein determining that the input file comprises the structured data is based at least in part on the header data.

6. The method of claim 4, wherein determining the aggregated personally identifiable information results data comprises:
determining that a number of data values associated with a data type and determined to be associated with a type of personally identifiable information in the standardized input data meets or exceeds a threshold; and
based at least in part on determining that the number of data values associated with the data type and determined to be associated with the type of personally identifiable information in the standardized input data meets or exceeds the threshold, determining the aggregated personally identifiable information results data to include an indication of the data type and the number of data values associated with the data type represented in the input file.

7. The method of claim 4, wherein determining the aggregated personally identifiable information results data comprises:
determining that a number of data values associated with a data type and determined to be associated with a type of personally identifiable information in the standardized input data is less than a threshold; and
based at least on determining that the number of data values associated with the data type and determined to be associated with the type of personally identifiable information in the standardized input data is less than the threshold, excluding the data type from the aggregated personally identifiable information results data.

8. The method of claim 4, wherein determining the standardized input data comprises associating a header value with individual data values represented in the sampled subset of data.

9. The method of claim 4, further comprising:
receiving, at the personally identifiable information detection system, a second input file; determining a lack of structured data associated with the second input file; and
based at least in part on determining the lack of structured data associated with the second input file, transmitting the second input file to an unstructured data processing system.

10. The method of claim 4, further comprising receiving the machine-learned personally identifiable information detection model from a machine-learned model training system configured to:
determine standardized training data comprising second personally identifiable information based at least in part on one or more of synthetic training data or user data; and train the machine-learned personally identifiable information detection model at the machine-learned model training system using the standardized training data.

11. The method of claim 10, wherein the machine-learned model training system is further configured to determine the standardized training data by concatenating a header value represented in one or more of the synthetic training data or the user data, a special character, and a data value represented in a column of data associated with the header value.

12. The method of claim 4, further comprising transmitting the aggregated personally identifiable information results data for presentation on a user interface.

13. The method of claim 4, wherein the aggregated personally identifiable information results data comprises one or more of:
 a first indication of a data type indicated in the header data of the input file; and
 a second indication of a quantity of values associated with the header data represented in the input file.

14. A system comprising:
 one or more processors; and
 one or more computer-readable media storing computer-executable instructions that, when executed by the one or more processors, cause a personally identifiable information detection system to perform operations comprising:
  receiving an input file;
  determining that the input file comprises structured data;
  determining, from the structured data of the input file, a first portion of the structure data encoding substantive data;
  determining, from the structured data of the input file, that a second portion of the structure data encoding descriptive data;
  sampling a subset of user data represented in the first portion of the structured data of the input file;
  determining standardized input data based at least in part on header data represented in the second portion of the structured data file and the sampled subset of the user data;
  executing a machine-learned personally identifiable information detection model using the standardized input data to determine personally identifiable information represented in the standardized input data;
  determining, based at least in part on the personally identifiable information represented in the standardized input data and the user data, aggregated personally identifiable information results data; and
  transmitting the aggregated personally identifiable information results data to a computing resource.

15. The system of claim 14, wherein determining that the input file comprises the structured data is based at least in part on determining a multipurpose internet mail extension type associated with the input file.

16. The system of claim 14, wherein determining that the input file comprises the structured data is based at least in part on the header data and comprises determining one or more of:
 the header data comprises substantive data;
 a first type of header data is distinct from a second type of corresponding user data;
 a first value of header data is distinct from a second value of corresponding user data; or
 a threshold number of data units associated with the header data have a first size that is substantially similar to a second size of corresponding data units of user data.

17. The system of claim 14, wherein the operations further comprise receiving the machine-learned personally identifiable information detection model from a machine-learned model training system configured to train the machine-learned personally identifiable information detection model using standardized training data comprising header values associated with individual synthetic user data values.

18. The system of claim 14, wherein the operations further comprise performing one or more pattern matching operations to determine second personally identifiable information represented in the standardized input data, wherein determining the aggregated personally identifiable information results data is further based at least in part on the second personally identifiable information represented in the standardized input data and the user data.

19. The system of claim 14, wherein the aggregated personally identifiable information results data excludes data associated with a subset of the user data associated with less than a threshold portion of the user data associated with at least one type of personally identifiable information represented in the user data.

20. The system of claim 14, wherein:
 determining the aggregated personally identifiable information results data comprises determining a header data value associated with a type of personally identifiable information represented in the user data; and
 the aggregated personally identifiable information results data comprises a quantity of user data associated with the header data value and an indication of the header data value.

\* \* \* \* \*